(12) United States Patent
Akiyama et al.

(10) Patent No.: US 8,998,421 B2
(45) Date of Patent: Apr. 7, 2015

(54) PROJECTOR HAVING POLARIZATION CONVERSION

(71) Applicant: Seiko Epson Corporation, Tokyo (JP)

(72) Inventors: Koichi Akiyama, Matsumoto (JP); Takayuki Matsubara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 13/776,072

(22) Filed: Feb. 25, 2013

(65) Prior Publication Data

US 2013/0229628 A1 Sep. 5, 2013

(30) Foreign Application Priority Data

Mar. 2, 2012 (JP) ................................ 2012-047090

(51) Int. Cl.
| | |
|---|---|
| G03B 21/14 | (2006.01) |
| G02B 27/28 | (2006.01) |
| G02B 5/02 | (2006.01) |
| G03B 21/20 | (2006.01) |
| G02B 27/48 | (2006.01) |

(52) U.S. Cl.
CPC ............ *G02B 27/283* (2013.01); *G02B 5/0294* (2013.01); *G02B 27/286* (2013.01); *G02B 27/48* (2013.01); *G03B 21/2033* (2013.01); *G03B 21/2073* (2013.01)

(58) Field of Classification Search
CPC .. G02B 27/145; G02B 27/149; G02B 27/283; G02B 26/0825; G02B 26/0841; H04N 9/3167; H04N 9/3197

USPC ................... 353/8, 20, 30, 31, 37, 84, 85, 94; 359/207.1, 207.7, 223.1, 230, 292, 359/295, 298; 349/5, 7–98
See application file for complete search history.

(56) References Cited

U.S. PATENT DOCUMENTS

| | | | |
|---|---|---|---|
| 6,208,463 B1 * | 3/2001 | Hansen et al. ........... 359/485.05 |
| 7,922,333 B2 | 4/2011 | Akahane et al. | |
| 2005/0231690 A1 * | 10/2005 | Newell et al. ................... 353/20 |
| 2009/0310042 A1 * | 12/2009 | Vidal et al. ........................ 349/8 |
| 2010/0007852 A1 * | 1/2010 | Bietry et al. ...................... 353/8 |
| 2010/0171927 A1 * | 7/2010 | Kitano et al. ................... 353/20 |
| 2011/0164221 A1 * | 7/2011 | Tilleman et al. ................ 353/20 |

FOREIGN PATENT DOCUMENTS

JP  B2 4193864  12/2008

* cited by examiner

*Primary Examiner* — Sultan Chowdhury
(74) *Attorney, Agent, or Firm* — Oliff PLC

(57) ABSTRACT

A projector includes a solid-state light source that emits linearly polarized light, a birefringence element that converts the linearly polarized light emitted from the solid-state light source into circularly or elliptically polarized light, a diffusion element that diffuses the light having exited from the birefringence element, and a polarization conversion element that separates the diffused light having exited from the diffusion element into first polarized light polarized in a first polarization direction and second polarized light polarized in a second polarization direction, converts the polarization direction of the first polarized light into the second polarization direction, and outputs the resultant first and second polarized light.

12 Claims, 12 Drawing Sheets

PROJECTOR HAVING POLARIZATION CONVERSION

BACKGROUND

1. Technical Field

The present invention relates to a projector.

2. Related Art

In recent years, a projector using a laser light source as a broad gamut, highly efficient light source has received attention in terms of performance enhancement of a projector.

A known example of a projector of this type includes a laser light source that emits laser light, a light diffusing section that diffuses the laser light emitted from the laser light source, and a polarization conversion element that converts the diffused light having exited from the light diffusing section into polarized light having a specific oscillation direction (see Japanese Patent No. 4193864, for example).

The polarization conversion element separates light incident from the light diffusing section into P-polarized light and S-polarized light and aligns the polarization direction of one of the separated polarized light fluxes with the polarization direction of the other one of the separated polarized light fluxes before they exit out of the polarization conversion element. The laser light emitted from the laser light source, which is substantially uniform, linearly polarized light, is depolarized when diffused in the light diffusing section and then incident on the polarization conversion element. That is, the linearly polarized light emitted from the laser light source is incident on the polarization conversion element after changed to incomplete linearly polarized light. If the depolarization in the light diffusing section is insufficient, however, the P-polarized light and the S-polarized light separated from the diffused light having exited from the light diffusing section differ from each other in terms of luminance, resulting in intensity unevenness of the light having exited from the polarization conversion element. When the light having intensity unevenness is used as illuminated light, light with which a screen is irradiated may have illuminance unevenness and hence the quality of a displayed image may decrease.

SUMMARY

An advantage of some aspects of the invention is to provide a projector capable of suppressing occurrence of illuminance unevenness and providing excellent quality of a displayed image.

An aspect of the invention is directed to a projector including a solid-state light source that emits linearly polarized light, a birefringence element that converts the linearly polarized light emitted from the solid-state light source into circularly or elliptically polarized light, a diffusion element that diffuses the light having exited from the birefringence element, and a polarization conversion element that separates the diffused light having exited from the diffusion element into first polarized light polarized in a first polarization direction and second polarized light polarized in a second polarization direction, converts the polarization direction of the first polarized light into the second polarization direction, and outputs the resultant second polarized light.

According to the configuration described above, since the linearly polarized light emitted from the solid-state light source is converted into circularly or elliptically polarized light, which is then diffused by the diffusion element, the diffused light having exited from the diffusion element contains P-polarized light and S-polarized light with the proportions thereof roughly equal to each other, whereby the degree of intensity unevenness of the light that exits from the polarization conversion element is reduced, and the projector is characterized by reduced illuminance unevenness and excellent image display quality.

It is preferable that the projector described above further includes an optical unit disposed in an optical path between the solid-state light source and the birefringence element, and the optical unit parallelizes the linearly polarized light emitted from the solid-state light source and delivers the parallelized linearly polarized light to the birefringence element.

When linearly polarized light is obliquely incident on a birefringence element, the performance of which typically depends on the angle of incidence of the light incident thereon, the linearly polarized light may not be converted into light having a desired polarization state in some cases.

In contrast, in the projector according to the aspect of the invention, since the optical unit, which parallelizes the linearly polarized light emitted from the solid-state light source and delivers the parallelized linearly polarized light to the birefringence element, is provided in the optical path between the solid-state light source and the birefringence element, the linearly polarized light is incident on the birefringence element roughly at right angles. The linearly polarized light can therefore be converted into light having a desired polarization state, whereby occurrence of illuminance unevenness can be reliably suppressed.

Another aspect of the invention is directed to a projector including a solid-state light source that emits linearly polarized light, a diffusion element that diffuses the linearly polarized light emitted from the solid-state light source, a birefringence element that converts the diffused light having exited from the diffusion element into circularly or elliptically polarized light, and a polarization conversion element that separates the light having exited from the birefringence element into first polarized light polarized in a first polarization direction and second polarized light polarized in a second polarization direction, converts the polarization direction of the first polarized light into the second polarization direction, and outputs the resultant second polarized light.

According to the configuration described above, since the diffused light having exited from the diffusion element is converted into circularly or elliptically polarized light, which is then delivered to the polarization conversion element, the light incident on the polarization conversion element contains P-polarized light and S-polarized light with the proportions thereof roughly equal to each other, whereby the degree of intensity unevenness of the light that exits from the polarization conversion element is reduced, and the projector is characterized by reduced illuminance unevenness and excellent image display quality.

It is preferable that the projector described above further includes an optical unit disposed in an optical path between the diffusion element and the birefringence element, and the optical unit parallelizes the diffused light having exited from the diffusion element and delivers the parallelized linearly polarized light to the birefringence element.

When linearly polarized light is obliquely incident on a birefringence element, the performance of which typically depends on the angle of incidence of the light incident thereon, the linearly polarized light may not be converted into light having a desired polarization state in some cases.

In contrast, in the projector according to the above aspect of the invention, since the optical unit, which parallelizes the diffused light having exited from the diffusion element and delivers the parallelized diffused light to the birefringence element, is provided in the optical path between the diffusion element and the birefringence element, the diffused light is incident on the birefringence element roughly at right angles. The diffused light can therefore be converted into light having a desired polarization state, whereby occurrence of illuminance unevenness can be reliably suppressed.

It is preferable that, in the projector described above, the birefringence element is a λ/2 plate whose optic axis is inclined to the polarization direction of the linearly polarized light incident on the birefringence element by an angle greater than or equal to −45° but smaller than or equal to +45°.

Alternatively, it is preferable that, in the projector described above, the birefringence element is a λ/4 plate whose optic axis is inclined to the polarization direction of the linearly polarized light incident on the birefringence element by an angle greater than or equal to −45° but smaller than or equal to +45°.

The configurations described above allow the linearly polarized light incident on the birefringence element to be readily converted into circularly or elliptically polarized light.

It is preferable that the projector described above further includes a shifter that shifts the position where the light is incident on the birefringence element.

The configuration described above allows heat generated by the light with which the birefringence element is irradiated to be dissipated over a large area along the direction in which the light incident position is shifted. As a result, the birefringence element will not be thermally degraded but can last long.

Still another aspect of the invention is directed to a projector including a first solid-state light source that emits first linearly polarized light, a second solid-state light source that emits second linearly polarized light, a diffusion element that diffuses the first linearly polarized light emitted from the first solid-state light source and the second linearly polarized light emitted from the second solid-state light source, and a polarization conversion element that separates the diffused light having exited from the diffusion element into first polarized light polarized in a first polarization direction and second polarized light polarized in a second polarization direction, converts the polarization direction of the first polarized light into the second polarization direction, and outputs the resultant polarized light.

The configuration described above prevents the light incident on the polarization conversion element from being biased toward P-polarized light or S-polarized light. As a result, the degree of intensity unevenness of the light that exits from the polarization conversion element is reduced, and the projector is characterized by reduced illuminance unevenness and excellent image display quality.

It is preferable that, in the projector according to the above aspect of the invention, the polarization conversion element includes a polarization separation film, that a component of the diffused light that has been emitted from the first solid-state light source is primarily formed of light polarized in a direction inclined by 0° to a plane of incidence of the polarization separation film, and that a component of the diffused light that has been emitted from the second solid-state light source is primarily formed of light polarized in a direction inclined by 90° to the plane of incidence of the polarization separation film.

It is preferable that, in the projector according to the above aspect of the invention, the polarization conversion element includes a polarization separation film, that a component of the diffused light that has been emitted from the first solid-state light source is primarily formed of light polarized in a direction inclined by 45° to a plane of incidence of the polarization separation film, and that a component of the diffused light that has been emitted from the second solid-state light source is primarily formed of light polarized in the direction inclined by 45° to the plane of incidence of the polarization separation film.

It is preferable that, in the projector described above, the number of the first solid-state light sources and the number of the second solid-state light sources are roughly equal to each other.

According to the configuration described above, the light incident on the polarization conversion element contains P-polarized light and S-polarized light with the proportions thereof roughly equal to each other, whereby the degree of intensity unevenness of the light that exits from the polarization conversion element is reduced, and the projector is characterized by reduced illuminance unevenness and excellent image display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings. Each of the embodiments shows an aspect of the invention but is not intended to limit the scope of the invention and can be arbitrarily changed within the range of the technical spirit of the invention. Further, in the following drawings, the scales, the numbers, and other parameters in the structure of each of the embodiments differ from those in an actual structure in order to show each component in a readily understandable manner.

First Embodiment

A projector according to an embodiment of the invention will be described with reference to FIGS. 1, 2, 3A to 3C, 4A and 4B, and 5A to 5C.

In the present embodiment, a projector 1000 will be described with reference to a projection-type projector that projects color light containing image information and produced by light modulation devices through a projection system on a screen (surface on which light is projected).

Figure 1:
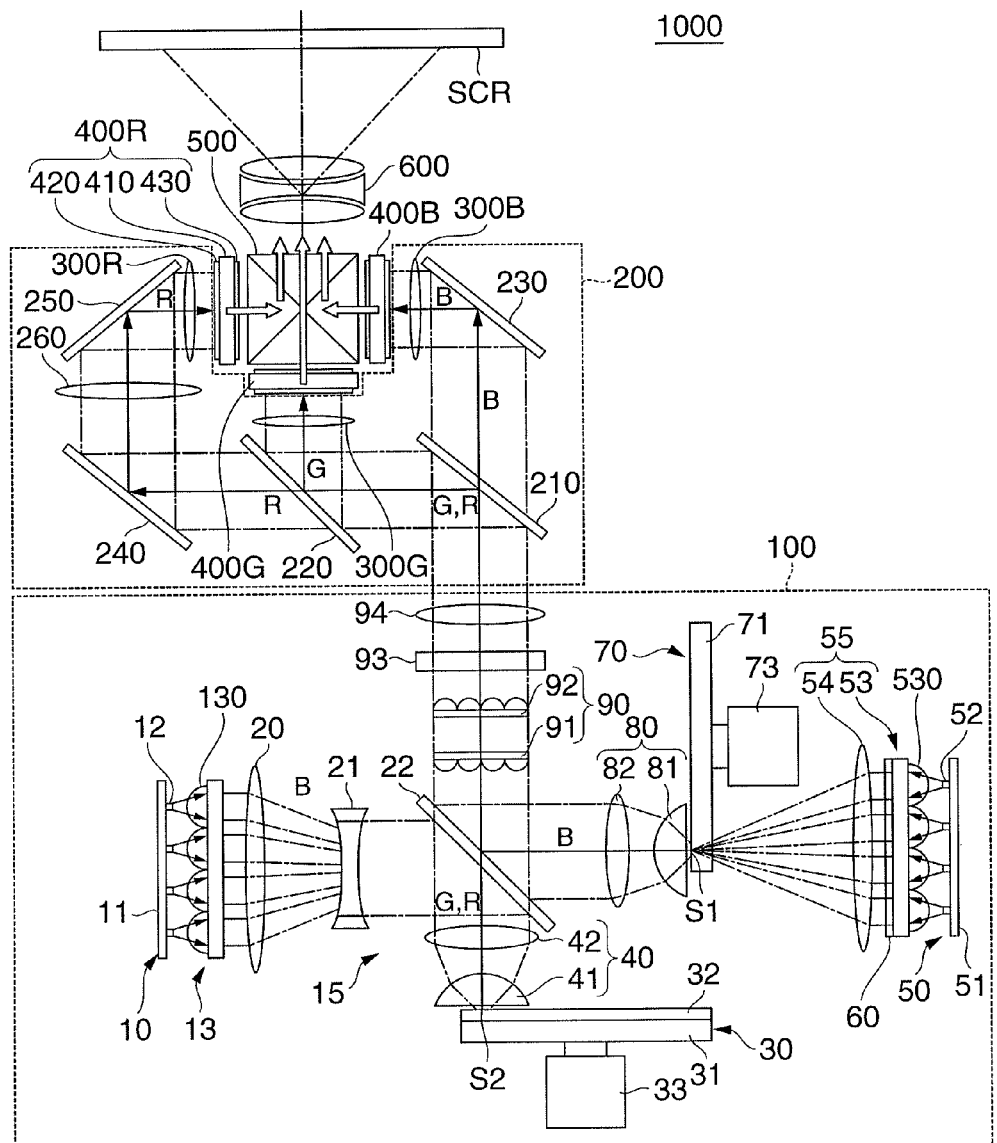
FIG. 1 is a pattern diagram showing the optical system of a projector according to a first embodiment of the invention.
Figure 2:
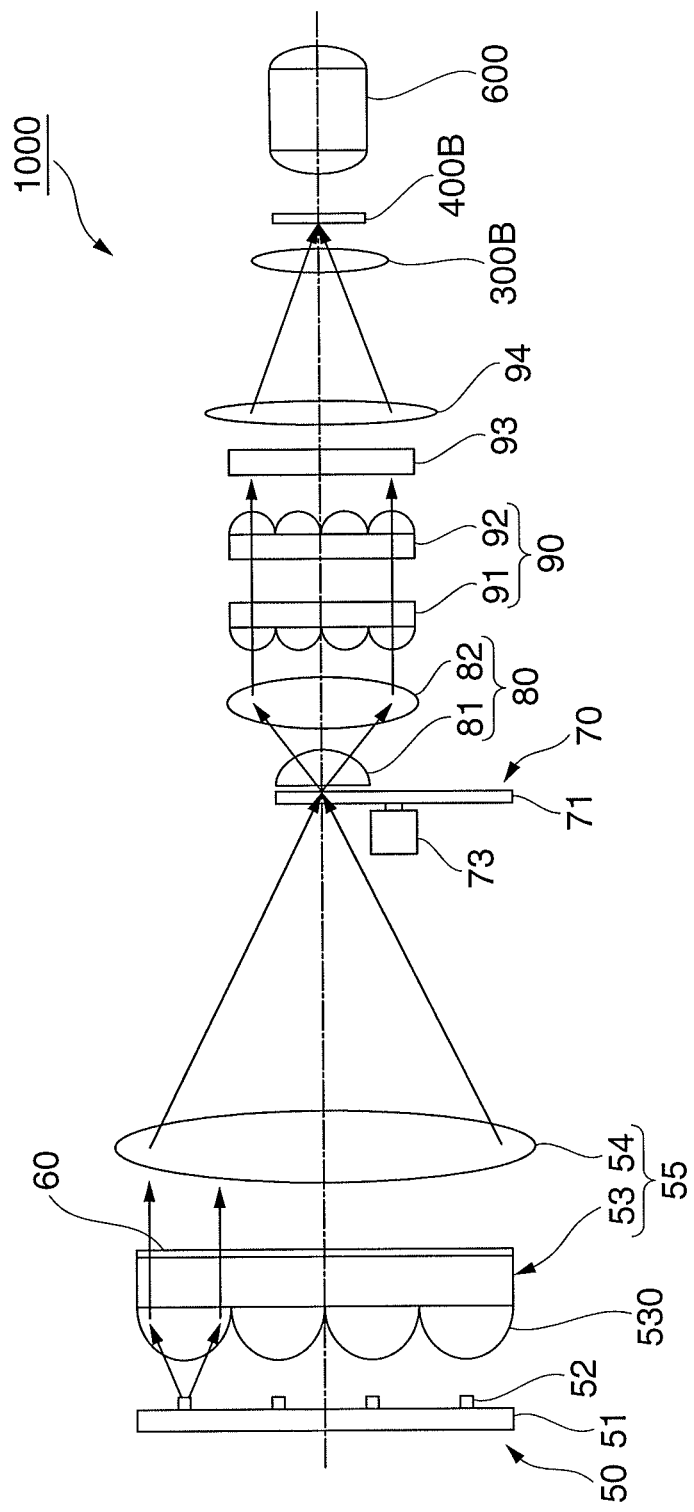
FIG. 2 is a schematic view showing the optical system of the projector according to the first embodiment of the invention.

FIG. 1 is a pattern diagram showing the optical system of the projector 1000 according to the first embodiment of the invention. FIG. 2 is a schematic view showing the optical system of the projector 1000. In FIG. 2, a second light source array 10, a dichroic mirror 22, and other members are omitted for convenience.

The projector 1000 includes an illuminator 100, a color separation/light guiding system 200, liquid crystal light modulators 400R, 400G, and 400B as light modulators, a cross dichroic prism 500, and a projection system 600, as shown in FIG. 1.

The illuminator 100 includes a first light source array 50, a first collimator lens array 53, a λ/2 plate 60, a first condenser lens 54, a rotating diffuser plate 70, a first pickup optical system 80, a second light source array 10, a second collimator lens array 13, a second condenser lens 20, a first parallelizing lens 21, a dichroic mirror 22, a second pickup optical system 40, a rotating fluorescence plate 30, a fly's eye integrator 90, a polarization conversion element 93, and a second parallelizing lens 94.

The first light source array 50 includes a first base 51 and a plurality of first solid-state light sources 52 arranged on the first base 51. Each of the first solid-state light sources 52 emits blue light that the dichroic mirror 22 can reflect. In the present embodiment, each of the first solid-state light sources 52 is a semiconductor laser that emits blue laser light (emission intensity peak: about 465 nm). Each of the first solid-state light sources 52 may alternatively emit light having a peak wavelength other than 465 nm as long as the light has a wavelength reflected off the dichroic mirror 22.

Figure 3A:
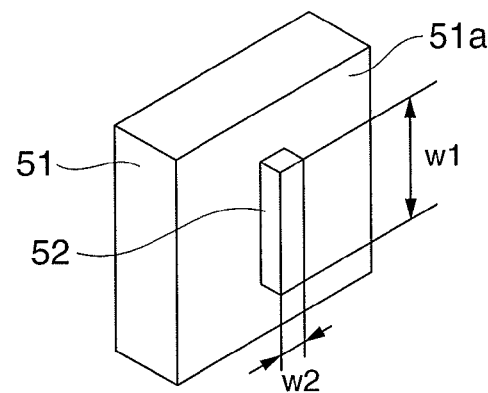
FIGS. 3A to 3C show the configuration of each first solid-state light source and the first solid-state light sources mounted on a first base according to the first embodiment of the invention.
Figure 3B:
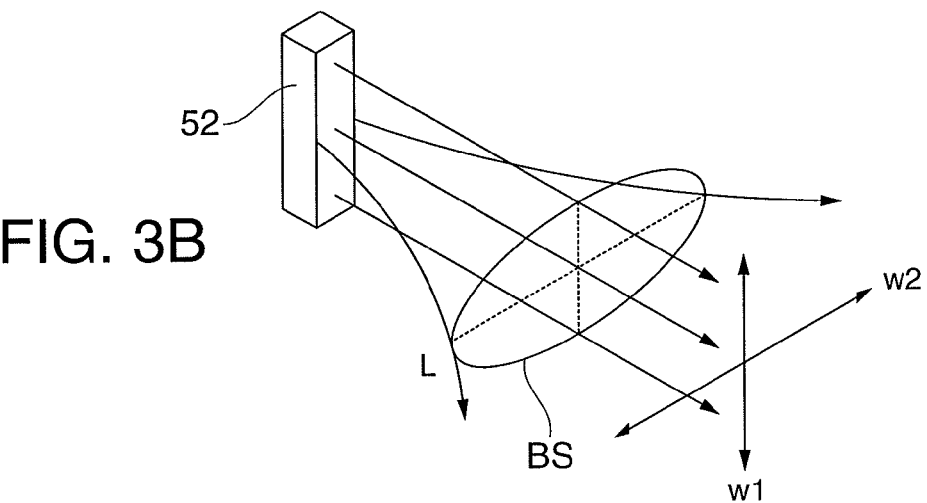
Figure 3C:
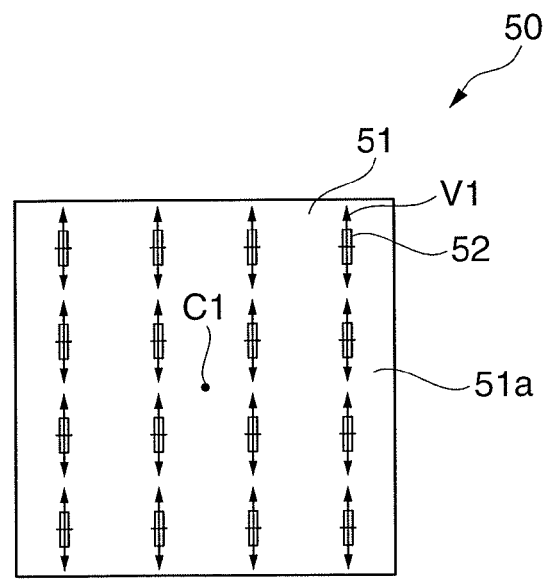

FIGS. 3A to 3C show the configuration of each of the first solid-state light sources 52 and the first solid-state light sources 52 mounted on the first base 51.

FIGS. 3A and 3B are pattern diagrams showing a schematic configuration of each of the first solid-state light sources 52. FIG. 3C is a plan view showing the plurality of first solid-state light sources 52 mounted on the first base 51. It is noted that FIG. 3A shows one of the plurality of first solid-state light sources 52 mounted on the first base 51 for ease of illustration.

Each of the first solid-state light sources 52 is a semiconductor laser having an elongated rectangular shape having a longitudinal direction W1 and a short-side transverse direction W2 when viewed in the optical axis direction of light L emitted from the first solid-state light source 52, as shown in FIGS. 3A and 3B. Each of the first solid-state light sources 52 emits light L having a polarization direction parallel to the longitudinal direction W1 (linearly polarized light). The light L spreads out in the short-hand transverse direction W2 while maintaining its width in the longitudinal direction W1. The cross-sectional shape BS of the light L in a plane perpendicular to the optical axis of the light L is therefore a rectangle or an ellipse having a longitudinal direction extending in the W2 direction. In the present embodiment, the width of each of the first solid-state light sources 52 in the longitudinal direction W1 is 18 μm, and the width thereof in the short-hand transverse direction W2 is 2 μm, but the first solid-state light source 52 is not necessarily shaped this way.

Sixteen first solid-state light sources 52 are arranged on a surface 51a of the first base 51 in a matrix having four rows and four columns, as shown in FIG. 3C. The first light source array 50 in the present embodiment has sixteen first solid-state light sources 52 arranged therein, but the number of first solid-state light sources 52 arranged therein is not limited to sixteen. The center C1 of the first base 51 coincides with the optical axis of the first pickup optical system 80 shown in FIG. 1.

Each of the first solid-state light sources 52 delivers the blue linearly polarized light to the light incident surface of the λ/2 plate 60.

The sixteen first solid-state light sources 52 are so arranged in an orderly manner that the longitudinal direction thereof is parallel to a side of the first base 51 (right and left sides shown in FIG. 3C), which has a rectangular shape in a plan view. Each of the plurality of light fluxes emitted from the plurality of the first solid-state light sources 52 therefore has the same polarization direction V1.

The first collimator lens array 53 has a plurality of first microlenses 530 corresponding to the first solid-state light sources 52 in a one-to-one relationship. Each of the first microlenses 530 is disposed in the optical axis of the blue light emitted from the corresponding first solid-state light source 52 and parallelizes the blue light. The blue light having exited from the first collimator lens array 53 is incident on the λ/2 plate 60.

The λ/2 plate 60 is a birefringence element that changes the polarization state of light incident thereon based on birefringence. The λ/2 plate 60 converts linearly polarized light having a polarization direction inclined by 45° to the optic axis (slow axis or fast axis) of the λ/2 plate into linearly polarized light having a polarization direction inclined by −45° to the optic axis. In the present embodiment, the angle between the optic axis of the λ/2 plate 60 and the polarization direction of the light emitted from the first solid-state light sources 52 is set at about 22.5°. The linearly polarized light emitted from each of the first solid-state light sources 52 is therefore converted by the λ/2 plate 60 into circularly or elliptically polarized light. The angle between the optic axis of the λ/2 plate 60 and the polarization direction of the light emitted from the first solid-state light sources 52 is not limited to 22.5° and may alternatively be any angle greater than or equal to −45° but smaller than or equal to +45°.

The light having exited from the λ/2 plate 60 contains S-polarized light with respect to polarization separation films 931, which will be described later, and P-polarized light with respect to the polarization separation films 931 with the proportion of the S-polarized and the proportion of P-polarized light roughly equal to each other, whereby when the polarization conversion element 93, which will be described later, separates the light having exited from the λ/2 plate 60 into the S-polarized light and the P-polarized light and guides them to respective separate areas, the light fluxes that exit through the areas do not show large difference in intensity. The phrase "roughly equal to each other" used herein means that the difference in proportion between the S-polarized light and the P-polarized light falls within ±5%. One of the polarization direction of the S-polarized light with respect to the polarization separation films 931 and the polarization direction of the P-polarized light with respect to the polarization separation films 931 corresponds to a first polarization direction in the invention, and the other polarization direction corresponds to a second polarization direction in the invention.

The λ/2 plate 60 is made of a material containing a resin material or any other suitable organic material. The λ/2 plate 60 is a thin-plate like member, such as a plastic film. The λ/2 plate 60 may alternatively be made of a material containing quartz or any other suitable inorganic material.

The λ/2 plate 60 is disposed at the light exiting surface of the first collimator lens array 53. The first collimator lens array 53 functions as an optical unit that parallelizes the linearly polarized light emitted from the first solid-state light sources 52 and delivers the parallelized light to the λ/2 plate 60. When the λ/2 plate 60 is disposed at the light exiting surface of the first collimator lens array 53, the linearly polarized light emitted from the first solid-state light sources 52 is incident on the λ/2 plate 60 roughly at right angles, whereby the linearly polarized light can be reliably converted into light having a desired polarization state. Further, since the light emitted from the first solid-state light sources 52 and incident on the λ/2 plate 60 is not concentrated but is collimated, the λ/2 plate 60 will not be thermally degraded due to heat generated by the light emitted from the first solid-state light sources 52. It is noted that the λ/2 plate 60 is not necessarily disposed at the light exiting surface of the first collimator lens array 53 but may be disposed in any position in the optical path between the first light source array 50 and the rotating diffuser plate 70. It is, however, also noted that the λ/2 plate 60 is preferably disposed in the optical path between the first collimator lens array 53 and the first condenser lens 54 because the advantageous effect described above is provided.

Referring back to FIG. 1, the circularly or elliptically polarized light having exited from the λ/2 plate 60 is collected by the first condenser lens 54, which is formed of a convex lens. The first collimator lens array 53 and the first condenser lens 54 form a first light collection system 55 that collects the plurality of blue light fluxes emitted from the first light source array 50.

The rotating diffuser plate 70 is a transmissive rotating diffuser plate that diffuses the blue light incident thereon and outputs the diffused light through the surface facing away from the surface on the light incident side. The rotating diffuser plate 70 includes a substrate 71 as a diffusion element rotatively driven by a motor (rotary drive mechanism) 73. The substrate 71 can be a known diffuser plate, such as a ground glass plate, a holographic diffuser, a transparent substrate having a blasted surface, and a transparent substrate in which scatterers, such as beads, are dispersed and the scatterers scatter light. The substrate 71 is a circular plate in the present embodiment, but the shape of the substrate 71 is not necessarily circular. By rotating the substrate 71, the portion of the substrate 71 that was irradiated with the blue light (irradiated portion) moves relative to an area S1 that is to be irradiated with the blue light (light irradiation area) such that the irradiated portion draw a circle.

The light having exited from the rotating diffuser plate 70 is parallelized by the first pickup optical system 80 and then incident on the dichroic mirror 22. The dichroic mirror 22 is so disposed that a surface thereof faces the light emitting surface of the first light source array 50 but is inclined thereto by about 45°. The dichroic mirror 22 deflects the blue light incident through the first pickup optical system 80 by 90° and reflects the blue light toward the fly's eye integrator 90.

The refractive index and the shape of each lens used in the first pickup optical system 80 are determined in accordance with the degree of spread of the blue light having exited from the rotating diffuser plate 70. The number of lenses in the first pickup optical system 80 is not limited to two and can alternatively be one or three or more.

The light incident on the rotating diffuser plate 70 is diffused by the rotating diffuser plate 70 to form radially spreading light. The diffused light is incident on the light incident surface of a first lens 81 in the first pickup optical system. The first lens 81 refracts the light having exited from the rotating diffuser plate 70 and delivers the light to a second lens 82. The light having passed through the first lens 81 and entered the second lens 82 is reflected off the dichroic mirror 22 and incident on the color separation/light guiding system 200, where the light is used as illumination light with which the light modulators 400R, 400G, and 400B is illuminated.

The second light source array 10 includes a second base 11 and a plurality of second solid-state light sources 12 arranged on the second base 11. The second solid-state light sources 12 emit excitation light that excites a fluorescent material layer 32 provided on the rotating fluorescence plate 30. In the present embodiment, each of the second solid-state light sources 12 is a semiconductor laser that emits blue laser light (emission intensity peak: about 446 nm) as the excitation light. Using a solid-state light source formed of a semiconductor laser that emits blue light having an emission intensity peak ranging from 440 nm to 450 nm as the excitation light can improve the efficiency at which the fluorescent material layer converts the blue light into fluorescence. The second solid-state light sources 12 may alternatively emit light having a peak wavelength other than 446 nm but any wavelength that can excite the fluorescent material layer 32.

Sixteen second solid-state light sources 12 are arranged on the second base 11 in a matrix having four rows and four columns. The center of the second base 11 coincides with the optical axis of the second pickup optical system 40. The configuration of each of the second solid-state light sources 12 is the same as the configuration of each of the first solid-state light sources 52 shown in FIGS. 3A and 3B. That is, each of the second solid-state light sources 12 is a semiconductor laser having an elongated rectangular shape having a longitudinal direction and a short-side transverse direction when viewed in the optical axis direction of the light emitted from the second solid-state light source 12. Each of the second solid-state light sources 12 emits light having a polarization direction parallel to the longitudinal direction of the second solid-state light source 12 (linearly polarized light).

The second collimator lens array 13 has a plurality of second microlenses 130 corresponding to the second solid-state light sources 12 in a one-to-one relationship. Each of the second microlenses 130 is disposed in the optical axis of the excitation light emitted from the corresponding second solid-state light source 12 and parallelizes the excitation light. The excitation light having exited from the second collimator lens array 13 is collected by the second condenser lens 20, which is formed of a convex lens.

The first parallelizing lens 21, which is formed of a biconcave lens, is disposed in the light path of the excitation light between the second condenser lens 20 and the dichroic mirror 22. The first parallelizing lens 21, which is specifically disposed between the second condenser lens 20 and the focal point thereof, parallelizes the excitation light incident through the second condenser lens 20 and directs the parallelized excitation light toward the dichroic mirror 22.

The dichroic mirror 22 is so disposed that a surface thereof faces the light emitting surface of the second light source array 10 and the surface of the fluorescent material layer 32 but is inclined to the two surfaces by about 45°. The dichroic mirror 22 not only deflects the excitation light (blue light component) incident through the first parallelizing lens 21 by 90° and reflects the excitation light toward the second pickup optical system 40 but also transmits the fluorescence (red and green light components) incident through the second pickup optical system 40.

The second pickup optical system 40 is disposed in the optical path of the excitation light and the fluorescence between the dichroic mirror 22 and the rotating fluorescence plate 30. The second pickup optical system 40 includes a first lens 41 that suppresses the degree of spread of the fluorescence from the rotating fluorescence plate 30 and a second lens 42 that parallelizes the fluorescence incident through the first lens 41. The first lens 41 is formed, for example, of a plano-convex lens having a flat surface facing the rotating fluorescence plate 30 and a convex curved surface facing away from the flat surface, and the second lens 42 is formed, for example, of a convex lens.

The second pickup optical system 40 substantially parallelizes the fluorescence from the rotating fluorescence plate 30 and delivers the fluorescence to the dichroic mirror 22. The first lens 41 and the second lens 42 of the second pickup optical system 40 also has a function of collecting the excitation light incident from the dichroic mirror 22 and delivers the collected excitation light to the rotating fluorescence plate 30. That is, the second collimator lens array 13, the second condenser lens 20, the first parallelizing lens 21, the dichroic mirror 22, and the second pickup optical system 40 form a second light collection system 15 that collects the plurality of excitation light fluxes emitted from the second light source array 10.

The refractive index and the shape of the lenses used in the second pickup optical system 40 are determined in accordance with the degree of spread of the fluorescence emitted from the rotating fluorescence plate 30. The number of lenses in the second pickup optical system 40 is not limited to two and can alternatively be one or three or more.

The rotating fluorescence plate 30 is a reflective rotating fluorescence plate that emits fluorescence along the same direction as the direction in which the excitation light is incident on the rotating fluorescence plate 30. The rotating fluorescence plate 30 includes a substrate 31 rotatively driven by a motor (rotary drive mechanism) 33 and the fluorescent material layer 32 formed on a surface of the substrate 31. The substrate 31 is made of a material that reflects the fluorescence emitted from the fluorescent material layer 32. The substrate 31 is preferably made of Al or any other metal material having high heat conductivity, whereby the substrate 31 can serve as a heat dissipater. The fluorescent material layer 32 has a ring-like shape along the direction in which the substrate 31 is rotated so that the ring-shaped area corresponds to the area on which the excitation light is incident. The substrate 31 is a circular plate in the present embodiment, but the shape of the substrate 31 is not necessarily circular.

The fluorescent material layer 32 is made of a particulate fluorescent substance (fluorescent material particles) that absorbs the excitation light emitted from the second solid-state light sources 12 and emits fluorescence. The fluorescent material layer 32 has a function of absorbing excitation light having a wavelength of about 450 nm (blue light) and converting the excitation light into fluorescence having wavelengths ranging from about 490 nm to 750 nm (emission intensity peak: 570 nm). The fluorescence contains green light (wavelength of about 530 nm) and red light (wavelength of about 630 nm).

The fluorescent material particles can be made of a commonly known YAG-based (yttrium-aluminum-garnet) fluorescent material. For example, a YAG-based fluorescent material having a composition of $(Y,Gd)_3(Al,Ga)_5O_{12}:Ce$ and having an average diameter of 10 µm can be used. The fluorescent material particles may be made of only one material or may be a mixture of particles made of at least two materials.

The excitation light (blue light) collected by the first lens 41 and the second lens 42 is incident on the rotating fluorescence plate 30 through the surface of the fluorescent material layer 32. The rotating fluorescence plate 30 directs the red light and the green light (fluorescence) emitted from the fluorescent material layer 32 toward the side where the excitation light is incident on the rotating fluorescence plate 30. By rotating the substrate 31, the portion of the fluorescent material layer 32 that was irradiated with the excitation light (irradiated portion) moves relative to an area S2 that is to be irradiated with the excitation light (light irradiation area) such that the irradiated portion draw a circle.

The light having exited from the rotating fluorescence plate 30 is parallelized by the second pickup optical system 40 and incident on the dichroic mirror 22. The dichroic mirror 22, on which the light is incident through the second pickup optical system 40, reflects the excitation light (blue light) and removes it, whereas transmitting the green light and the red light. The blue light emitted from the first light source array 50 is incident on a surface of the dichroic mirror 22 which is opposite from a light incident surface on which the light through the second pickup optical system 40 is incident. Then, the blue light incident on the surface of the dichroic mirror 22 is reflected in a direction parallel to the optical axis of the light having exited through the second pickup optical system 40. As a result, the green light and the red light having exited through the second pickup optical system 40 and the blue light having exited through the first pickup optical system 80 are combined into white light.

The green light, the red light, and the blue light combined by the dichroic mirror 22 are incident on the fly's eye integrator 90, which is formed of a first fly's eye lens array 91 and a second fly's eye lens array 92, where the light intensity distribution of the combined light is made uniform. The green light, the red light, and the blue light having exited from the fly's eye integrator 90 are converted by the polarization conversion element 93 into linearly polarized light fluxes having the same polarization direction. The green light, the red light, and the blue light having exited from the polarization conversion element 93 are parallelized by the second parallelizing lens 94 and exit out of the illuminator 100.

The color separation/light guiding system 200 includes a dichroic mirror 210, a dichroic mirror 220, a reflection mirror 230, a reflection mirror 240, a reflection mirror 250, and a relay lens 260. The color separation/light guiding system 200 has a function of separating the light from the illuminator 100 into the red light, the green light, and the blue light and guiding the red light, the green light, and the blue light to the light modulators 400R, 400G, and 400B, respectively.

A condenser lens 300R is provided between the color separation/light guiding system 200 and the liquid crystal light modulator 400R. A condenser lens 300G is provided between the color separation/light guiding system 200 and the liquid crystal light modulator 400G. A condenser lens 300B is provided between the color separation/light guiding system 200 and the liquid crystal light modulator 400B.

Each of the dichroic mirrors 210 and 220 is a mirror formed of a substrate and a wavelength selective, transmissive film formed thereon. The wavelength selective, transmissive film is formed of a dielectric multilayer film that reflects light of a predetermined wavelength range and transmits light of the remaining wavelength range. Specifically, the dichroic mirror 210 transmits the blue light component and reflects the red and green light components. The dichroic mirror 220 reflects the green light component and transmits the red light component.

Each of the reflection mirrors 230, 240, and 250 is a mirror that reflects light incident thereon. Specifically, the reflection mirror 230 reflects the blue light component having passed through the dichroic mirror 210. The reflection mirrors 240 and 250 reflect the red light component having passed through the dichroic mirror 220.

The blue light having passed through the dichroic mirror 210 is reflected off the reflection mirror 230, passes through the condenser lens 300B, and is incident on an image formation area of the light modulator 400B for blue light.

The green light reflected off the dichroic mirror 210 is further reflected off the dichroic mirror 220, passes through the condenser lens 300G, and is incident on an image formation area of the light modulator 400G for green light.

The red light having passed through the dichroic mirror 220 travels along the light incident-side reflection mirror 240, the relay lens 260, the light exiting-side reflection mirror 250, and the condenser lens 300R and is incident on an image formation area of the light modulator 400R for red light.

Each of the light modulators 400R, 400G, and 400B can be a commonly known light modulator and is formed, for example, of a transmissive liquid crystal light valve including a liquid crystal device 410 and polarizers 420 and 430 that sandwich the liquid crystal device 410. The polarizers 420 and 430 are, for example, so configured that the transmission axes thereof are perpendicular to each other (crossed Nicol arrangement).

The light modulators 400R, 400G, and 400B, which modulate color light fluxes incident thereon in accordance with image information to form a color image, are illuminated by the illuminator 100. The light modulators 400R, 400G, and 400B modulate the color light fluxes incident thereon.

For example, each of the light modulators 400R, 400G, and 400B is a transmissive light modulator in which a liquid crystal material is encapsulated and sealed between a pair of transparent substrates and a polysilicon TFT is used as a switching device to modulate the polarization direction of one type of linearly polarized light having exited from the corresponding light incident-side polarizer 420 in accordance with provided image information.

The cross dichroic prism 500 is an optical element that combines the modulated color optical images having exited from light exiting-side polarizers 430 to form a color image. The cross dichroic prism 500 is formed by bonding four rectangular prisms and thus has a substantially square shape when in a plan view. Dielectric multilayer films are formed along substantially X-shaped interfaces between the bonded rectangular prisms. The dielectric multilayer film formed on one of the substantially X-shaped interfaces reflects the red light, and the dielectric multilayer film formed on the other interface reflects the blue light. The dielectric multilayer films deflect the red light and the blue light in such a way that the traveling directions of the red light and the blue light agree with the traveling direction of the green light. The three color light fluxes are thus combined.

The color image having exited from the cross dichroic prism 500 is enlarged and projected through the projection system 600 and forms an image on a screen SCR.

Figure 4A:
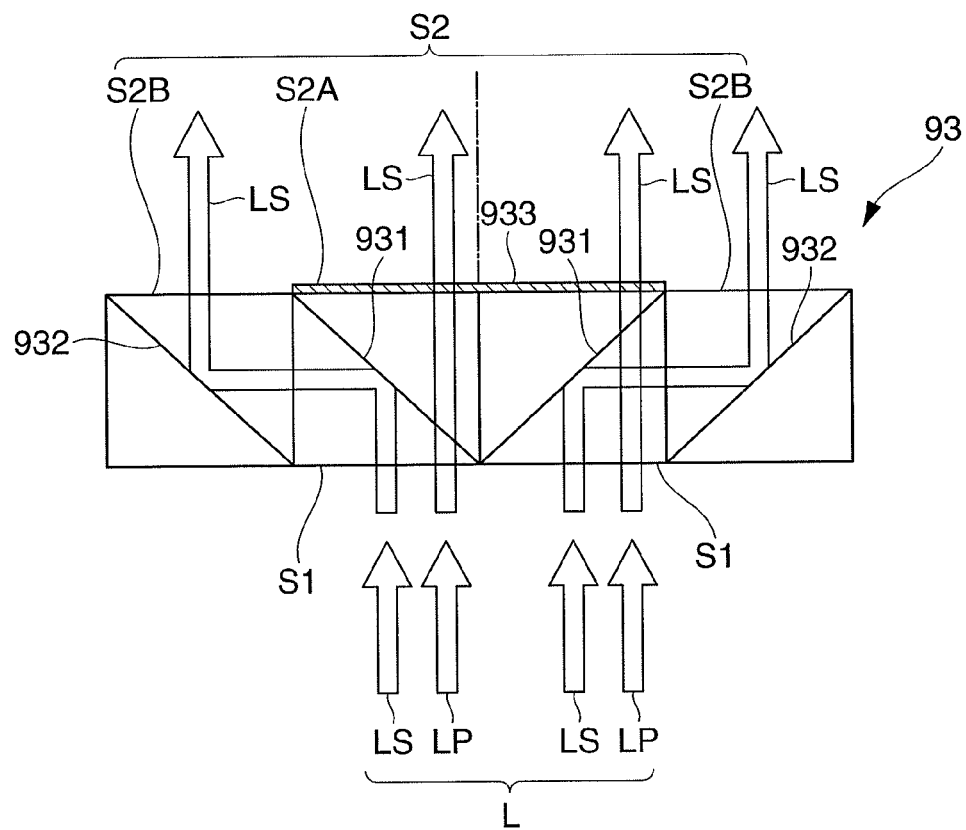
FIGS. 4A and 4B describe an effect of a birefringence element according to the first embodiment of the invention.
Figure 4B:
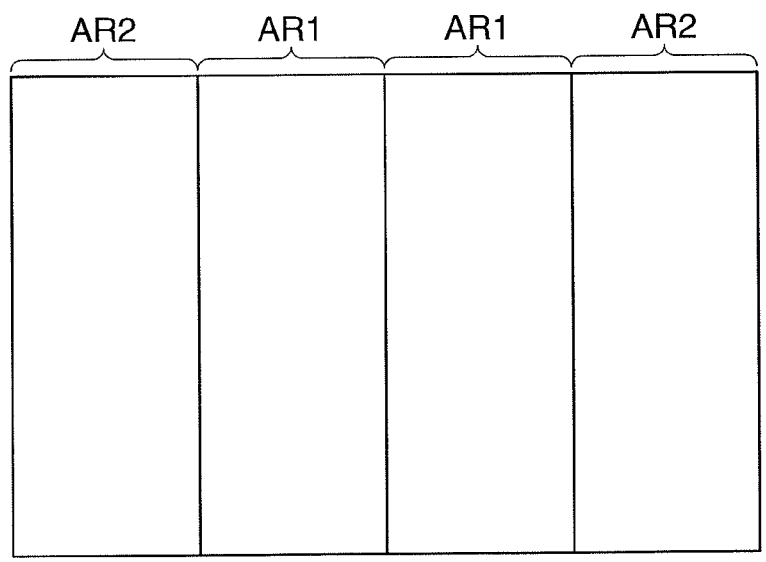

FIGS. 4A and 4B describe an effect of the λ/2 plate 60 in the present embodiment. FIG. 4A is a pattern diagram showing the polarization conversion element 93 provided in the projector 1000 according to the present embodiment. FIG. 4B shows an image of illumination light having exited from the polarization conversion element 93 in the present embodiment.

The polarization conversion element 93 includes a light incident surface S1, a light exiting surface S2, polarization separation films 931, reflection films 932, and a retardation film 933, as shown in FIG. 4A. The polarization conversion element 93 separates the light L incident through the fly's eye integrator 90 into P-polarized light LP with respect to the polarization separation films 931 and S-polarized light LS with respect to the polarization separation films 931 and aligns the polarization direction of the P-polarized light LP with the polarization direction of the S-polarized light LS before they exit out of the polarization conversion element 93. In the following description, the P-polarized light LP with respect to the polarization separation films 931 is called P-polarized light LP, and the S-polarized light LS with respect to the polarization separation films 931 is called S-polarized light LS.

The light incident surface S1 is a surface on which the light L through the fly's eye integrator 90 is incident.

The light exiting surface S2 is a surface through which the S-polarized light exits. The light exiting surface S2 has a first area S2A and second areas S2B adjacent to each other. The first area S2A coincides with the light incident area S1 when viewed in the direction in which the light L is incident through the fly's eye integrator 90. The second areas S2B do not overlap with the light incident area S1 when viewed in the direction in which the light L is incident through the fly's eye integrator 90.

The polarization separation films 931 are so disposed that they face the first area S2A but are inclined thereto. Specifically, the polarization separation films 931 obliquely face the first area S2A and are inclined thereto by about 45°. The polarization separation films 931 transmit the P-polarized light LP toward the first area S2A and reflect the S-polarized light LS.

The reflection films 932 reflect the S-polarized light LS having been reflected off the polarization separation films 931 toward the second areas S2B.

The retardation film 933 is disposed in the first area S2A. The retardation film 933 is formed, for example, of a λ/2 plate. The retardation film 933 converts the P-polarized light LP having passed through the polarization separation films 931 into the S-polarized light LS by rotating the polarization direction of the P-polarized light LP by 90°.

In the thus configured polarization conversion element 93, the light L through the fly's eye integrator 90 is incident on the light incident surface S1. The light L through the fly's eye integrator 90 contains both the S-polarized light LS and the P-polarized light LP, and the proportion of the S-polarized light LS and the proportion of the P-polarized light LP are roughly equal to each other.

The light L from the fly's eye integrator 90 passes through the light incident surface S1 and then enters the polarization separation films 931.

The S-polarized light LS, which is one of the components of the light incident on the polarization separation films 931, is reflected off the polarization separation films 931 and incident on the reflection films 932. The S-polarized light LS incident on the reflection films 932 is reflected off the reflection films 932 toward the second areas S2B. As described above, the S-polarized light LS incident through the light incident surface S1 exits as the S-polarized light LS through the second areas S2B of the light exiting surface S2.

On the other hand, the P-polarized light LP, which is the other component of the light incident on the polarization separation films 931, passes through the polarization separation films 931. The P-polarized light LP having passed through the polarization separation films 931 is incident on the retardation film 933, where the P-polarized light LP is converted into the S-polarized light LS and exits as the S-polarized light LS through the first area S2A of the light exiting surface S2. The light incident on the polarization separation films 931 through the light incident surface S1 of the polarization conversion element 93 therefore exits as the S-polarized light LS through the first area S2A and the second areas S2B of the light exiting surface S2.

In the polarization conversion element 93 of the present embodiment, the retardation film 933 is disposed in the first area S2A and converts the P-polarized light LP into the S-polarized light LS, but the polarization conversion element 93 is not necessarily configured this way. For example, the polarization conversion element 93 may alternatively be so configured that a retardation film is disposed in each of the second areas S2B instead of the first area S2A and converts the S-polarized light LS into the P-polarized light LP.

Figure 13A:
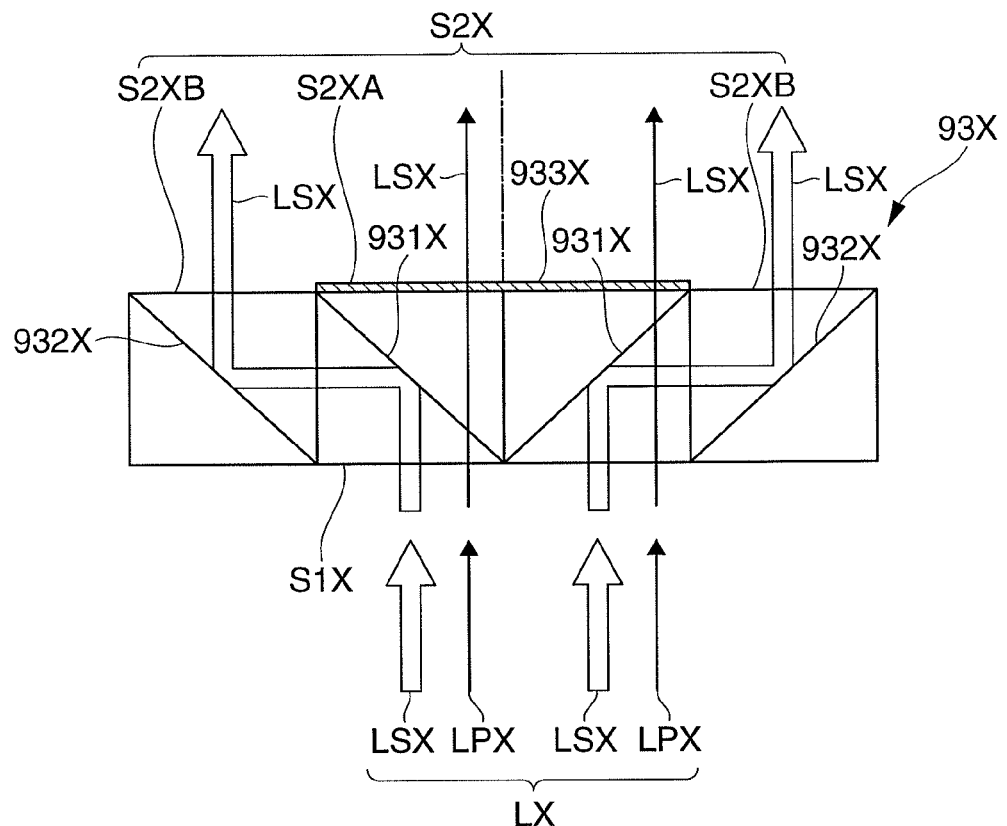
FIGS. 13A and 13B describe an effect of a projector according to Comparative Example.
Figure 13B:
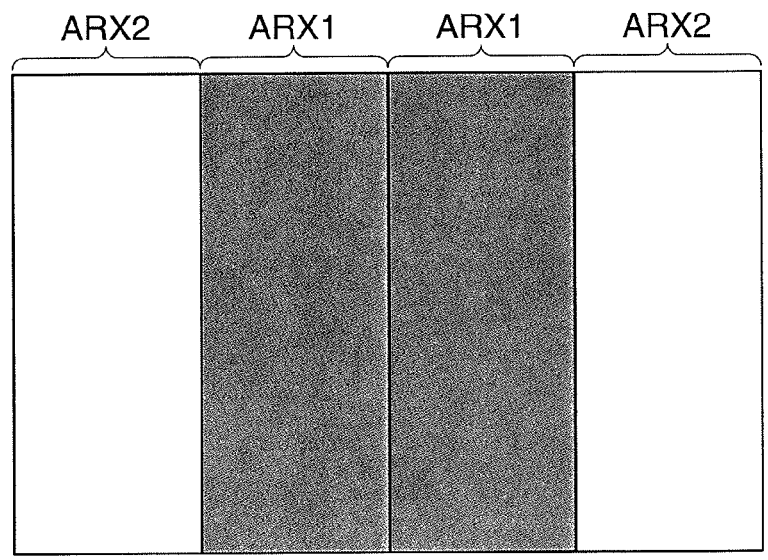

FIGS. 13A and 13B describe an effect of a projector according to Comparative Example. FIG. 13A is a pattern diagram showing a polarization conversion element 93X provided in the projector according to Comparative Example. FIG. 13B shows an image of illumination light having exited from the polarization conversion element 93X in Comparative Example.

The configuration of the polarization conversion element 93X in Comparative Example is the same as the configuration of the polarization conversion element 93 in the present embodiment as shown in FIG. 13A, and no description of the polarization conversion element 93X will therefore be made in detail. In FIG. 13A, reference character S1X denotes a light incident surface; reference character S2X denotes a light exiting surface; reference character S2XA denotes a first area; reference character S2XB denotes second areas; reference character 931X denotes polarization separation films; reference character 932X denotes reflection films; and reference character 933X denotes a retardation film.

The projector according to Comparative Example differs from the projector 1000 according to the present embodiment shown in FIG. 1 in that no λ/2 plate 60 is provided. In the projector according to Comparative Example, the linearly polarized light emitted from the first solid-state light sources is not converted into circularly or elliptically polarized light but is directly incident on the rotating diffuser plate, which cannot adequately depolarize the linearly polarized light but directs the resultant light toward the polarization conversion element 93X. As a result, the polarization state of the light incident on the polarization conversion element 93X strongly reflects the polarization state of the linearly polarized light emitted from the first solid-state light sources.

For example, consider a case where the linearly polarized light emitted from the first solid-state light sources is incident as S-polarized light on the polarization conversion element 93X. The rotating diffuser plate depolarizes to some extent the linearly polarized light (S-polarized light) emitted from the first solid-state light sources and produces a polarized light component polarized in a direction perpendicular to the direction in which the linearly polarized light is polarized (P-polarized light LPX), but the proportion of the P-polarized light LPX is much smaller than the proportion of a polarized light component that has not been depolarized but has been incident on the polarization conversion element (S-polarized light LSX). As a result, light LX incident on the light incident surface SIX contains both the S-polarized light LSX and the P-polarized light LPX, but the polarized light components LPX and LSX greatly differ from each other in terms of luminance.

The light LX passes through the light incident surface SIX and enters the polarization separation films 931X.

The S-polarized light LSX, which is one of the components of the light incident on the polarization separation films 931X, is reflected off the polarization separation films 931X and incident on the reflection films 932X. The S-polarized light LSX incident on the reflection films 932X is reflected off the reflection films 932X toward the second areas S2XB. As described above, the S-polarized light LSX incident through the light incident surface SIX exits as the S-polarized light LSX through the second areas S2XB of the light exiting surface S2X.

On the other hand, the P-polarized light LPX, which is the other component of the light incident on the polarization separation films 931X, passes through the polarization separation films 931X. The P-polarized light LPX having passed through the polarization separation films 931X is incident on the retardation film 933X, where the P-polarized light LPX is converted into the S-polarized light LSX and exits as the S-polarized light LSX through the first area S2XA of the light exiting surface S2X. The light incident on the polarization separation films 931X through the light incident surface S1X of the polarization conversion element 93X therefore exits as the S-polarized light LSX through the first area S2XA and the second areas S2XB of the light exiting surface S2X.

As described above, when the light LX incident on the light incident surface S1X is biased toward the S-polarized light LSX than toward the P-polarized light LPX, the intensity of the S-polarized light LSX that exits through the second areas S2XB is greater than the intensity of the S-polarized light LSX that exits through the first area S2XA. In view of the fact described above, when the light having exited from the polarization conversion element 93X is used as illumination light, line-shaped illuminance unevenness resulting from the difference in intensity between the light that exits through the first area S2XA and the light that exits through the second areas S2XB disadvantageously occurs on the screen.

In FIG. 13B, reference character ARX1 denotes an area of the screen that is irradiated with the light having exited through the first area S2XA of the polarization conversion element 93X, and reference character ARX2 denotes an area of the screen that is irradiated with the light having exited through either of the second areas S2XB of the polarization conversion element 93X.

The image of irradiation light with which the screen is irradiated in Comparative Example shows that the areas ARX1 are dark and the areas ARX2 are bright, as shown in FIG. 13B. The difference conceivably results from the fact that the intensity of the S-polarized light LSX that exits through the first area S2XA is lower than the intensity of the S-polarized light LSX that exits through the second areas S2XB.

In contrast, in the projector 1000 according to the present embodiment, in which the linearly polarized light emitted from the first solid-state light sources is converted by the λ/2 plate into circularly or elliptically polarized light and then diffused by the rotating diffuser plate, the diffused light having exited from the rotating diffuser plate contains the P-polarized light component and the S-polarized light component with the proportions thereof roughly equal to each other. As a result, the intensity of the light that exits through the first area S2A of the polarization conversion element 93 is roughly equal to the intensity of the light that exits through the second areas S2B of the polarization conversion element 93.

In FIG. 4B, reference character AR1 denotes an area of the screen that is irradiated with the light having exited through the first area S2A of the polarization conversion element 93, and reference character AR2 denotes an area of the screen that is irradiated with the light having exited through either of the second areas S2B of the polarization conversion element 93.

The image of irradiation light which has exited from the polarization conversion element 93 in the present embodiment and with which the screen is irradiated shows that a bright image is formed across the area AR1 and the areas AR2, as shown in FIG. 4B. FIG. 4B therefore shows that providing the λ/2 plate 60 as the birefringence element produces a satisfactory illumination image with unevenness suppressed.

As described above, according to the projector 1000 of the present embodiment, the linearly polarized light emitted from the first light source array 50 is converted by the λ/2 plate 60 into circularly or elliptically polarized light, and the resultant light incident on the rotating diffuser plate 70 contains P-polarized light and S-polarized light with the proportions thereof roughly equal to each other. Further, the light containing the two types of polarized light with the proportions thereof roughly equal to each other is diffused by the rotating diffuser plate 70, whereby the light incident on the polarization conversion element 93 is randomly polarized. As a result, the light fluxes that exit, respectively, through the light exiting areas S2A and S2B of the polarization conversion element 93 have roughly the same intensity. The projector 1000 can therefore suppress occurrence of illuminance unevenness and excel in the quality of a displayed image.

When linearly polarized light is obliquely incident on the λ/2 plate 60, which is a birefringence element and the performance thereof typically depends on the angle of incidence of the light incident thereon, the linearly polarized light may not be converted into light having a desired polarization state in some cases.

In contrast, in the projector 1000 according to the present embodiment of the invention, since the first collimator lens array 53 is provided in the optical path between the first light source array 50 and the λ/2 plate 60, the linearly polarized light is incident on the λ/2 plate 60 roughly at right angles. The linearly polarized light can therefore be converted into light having a desired polarization state, whereby occurrence of illuminance unevenness can be reliably suppressed.

Further, according to the configuration described above, occurrence of illuminance unevenness can be readily suppressed by appropriately adjusting the direction of the optic axis of the λ/2 plate 60 with respect to the polarization direction of the linearly polarized light.

Further, according to the projector 1000 of the present embodiment, since the substrate 71 is rotated by the motor 73, the position on the substrate 71 where the plurality of blue light fluxes focused by the first light collection system 55 are incident changes with time. When a semiconductor laser or any other solid-state light source that emits highly coherent light is used to display an image, light interference occurs at the screen SCR or any other surface that contains scatterers, and what is called a speckle phenomenon occurs, in which bright points and dark points are distributed in a fringe pattern or a patchy pattern. Rotating the substrate 71, however, changes the speckle pattern with time and hence the changing patterns are superimposed and averaged with time, whereby the speckle patterns become less recognizable. The quality of a displayed image can thus be improved.

In the projector 1000 according to the present embodiment, the λ/2 plate 60 is used as the birefringence element and the angle between the polarization direction of the linearly polarized light and the optic axis of the λ/2 plate 60 is set at an angle greater than or equal to −45° but smaller than or equal to +45°, but the projector 1000 is not necessarily configured this way. For example, a λ/4 plate can alternatively be used as the birefringence element.

When a λ/4 plate is used as the birefringence element, the λ/4 plate is so set that the optic axis thereof is inclined to the polarization direction of the light emitted from the first solid-state light sources 52 by an angle greater than or equal to −45° but smaller than or equal to +45°. In this case, the excitation light formed of S-polarized light and emitted from the first solid-state light sources 52 is converted into circularly or elliptically polarized light.

In the configuration described above as well, occurrence of illuminance unevenness can be readily suppressed by appropriately adjusting the direction of the optic axis of the λ/4 plate with respect to the polarization direction of the linearly polarized light.

Figure 5A:
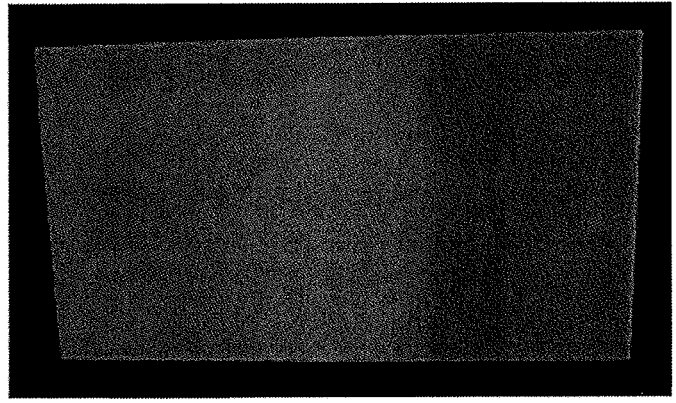
FIGS. 5A to 5C show images of illumination light having exited from polarization conversion elements in projectors according to Comparative Example and Inventive Examples.
Figure 5B:
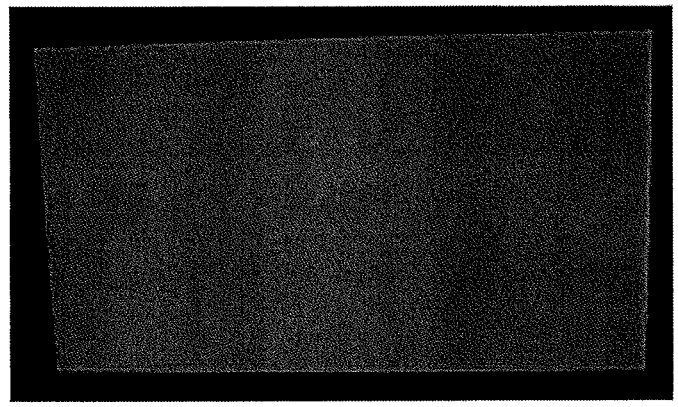
Figure 5C:
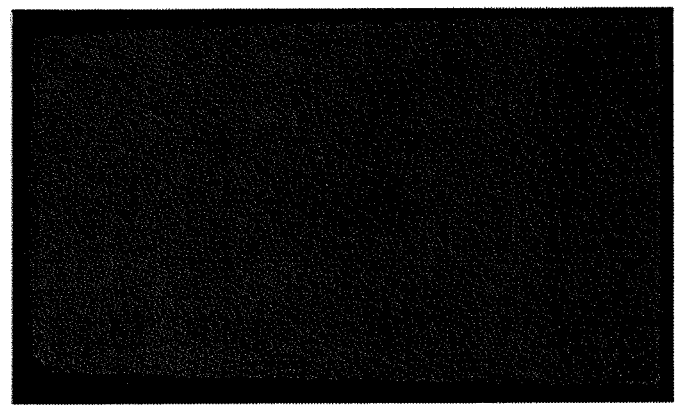

FIGS. 5A to 5C show images of illumination light having exited from the polarization conversion elements in projectors according to Comparative Example and Inventive Example.

FIG. 5A shows an illumination light image produced by the projector according to Comparative Example (having configuration in which proportions of S-polarized light component and P-polarized light component incident on light incident surface of polarization conversion element greatly differ from each other because no λ/2 plate is provided in optical path between first light source array and rotating diffuser plate).

FIG. 5B shows an illumination light image produced by the projector 1000 according to the present embodiment having a configuration in which a λ/4 plate is used as the birefringence element and the direction of the optic axis of the λ/4 plate is inclined by 45° to the polarization direction of the linearly polarized light.

FIG. 5C shows an illumination light image produced by the projector 1000 according to the present embodiment having a configuration in which the λ/2 plate 60 is used as the birefringence element; the direction of the optic axis of the λ/2 plate is inclined by about 22.5° to the polarization direction of the linearly polarized light; and the direction of the optic axis is so finely adjusted that the amount of illuminance unevenness on the screen is minimized.

The illumination light image produced by the projector according to Comparative Example shows illuminance unevenness, as shown in FIG. 5A. In contrast, the illumination light images produced by the projectors according to Inventive Examples show that occurrence of illuminance unevenness is suppressed, as shown in FIGS. 5B and 5C.

In the projector 1000 according to the present embodiment, in which the rotating diffuser plate 70 is used as a diffusing member that diffuses the light emitted from the first solid-state light sources 52, the diffusing member is not limited thereto. For example, a diffuser plate capable of oscillating the light emitted from the first solid-state light sources 52 in a direction that intersects the direction in which the emitted light is incident on the diffuser plate may be used.

Further, in the projector 1000 according to the present embodiment, in which the rotating plate 31 is used as the substrate on which the fluorescent material layer 32 is formed, the substrate is not limited to the rotating plate 31. For example, a substrate capable of oscillating in a direction that intersects the direction in which the excitation light is incident on the substrate may be used as the substrate on which the fluorescent material layer is formed.

Further, in the projector 1000 according to the present embodiment, which uses the solid-state light sources 12, which emit blue light as the excitation light, and the fluorescent material layer 32, which converts the blue light into fluorescence containing red light and green light, the projector 1000 is not necessarily configured this way. For example, solid-state light sources that emit violet or ultraviolet light as the excitation light and a fluorescent material layer that converts the violet or ultraviolet light into fluorescence containing red light, green light, and blue light may be used.

Further, in the projector 1000 according to the present embodiment, a liquid crystal light modulator is used as each of the light modulators, but each of the light modulators is not limited thereto. Each of the light modulators may be any device that modulates light incident thereon in accordance with image information, such as a micromirror-type light modulator. The micromirror-type light modulator can, for example, be a DMD (digital micromirror device) (trademark of TI Incorporated).

Further, in the projector 1000 according to the present embodiment, in which three liquid crystal light modulators are used as the light modulators, the number of liquid crystal light modulators is not limited to three. The present embodiment is also applicable to a projector using one, two, or four or more liquid crystal light modulators.

Further, the projector 1000 according to the present embodiment is a transmissive projector, but the projector 1000 is not limited thereto and may alternatively, for example, be a reflective projector. The term "transmissive" used herein means that a light modulator as a light modulation unit is of light transmitting type, such as a transmissive liquid crystal display device, and the term "reflective" used herein means that a light modulator as the light modulation unit is of light reflecting type, such as a reflective liquid crystal display device. When the invention is applied to a reflective projector, the same advantageous effects as those provided in a transmissive projector can also be provided.

Second Embodiment

Figure 6:
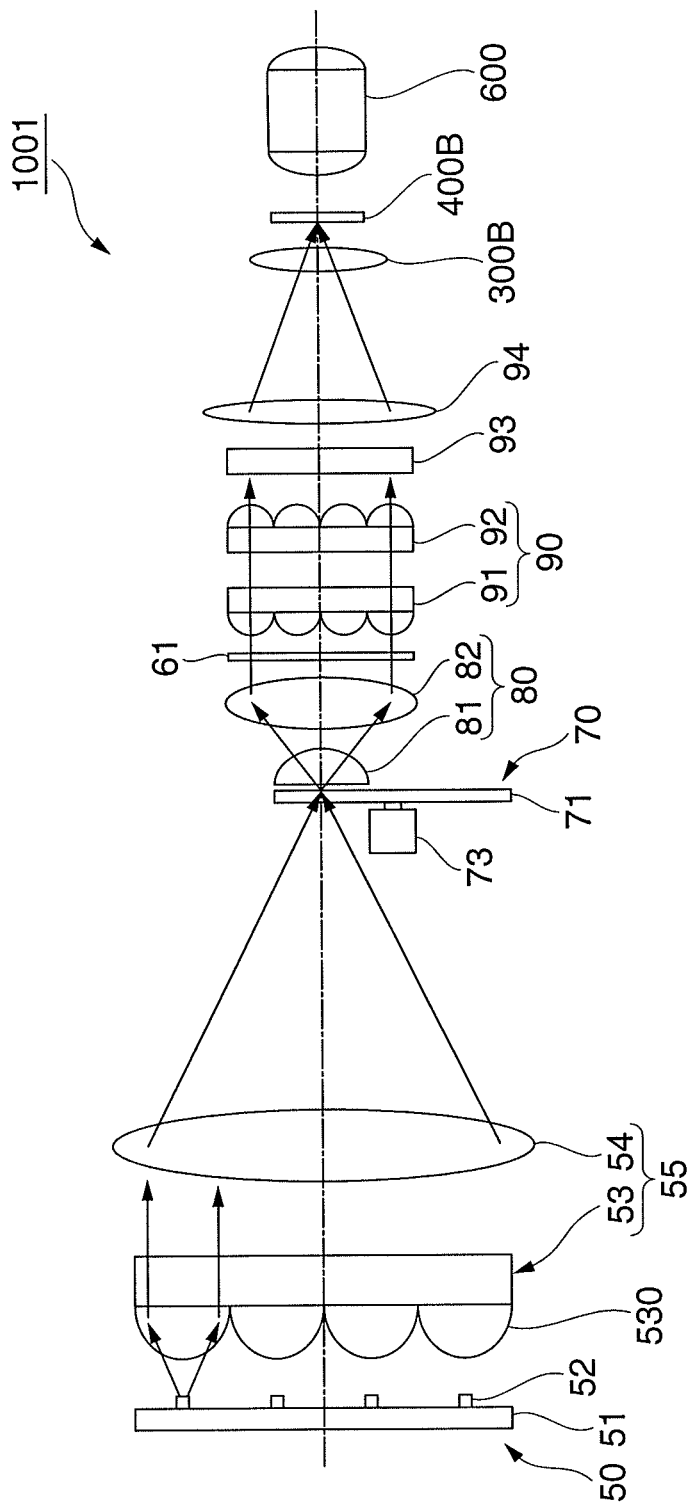
FIG. 6 is a schematic view showing the optical system of a projector according to a second embodiment of the invention.

FIG. 6 is a schematic view corresponding to FIG. 2 and showing the optical system of a projector 1001 according to a second embodiment of the invention.

The projector 1001 according to the present embodiment differs from the projector 1000 according to the first embodiment described above in that a $\lambda/2$ plate 61 as the birefringence element is disposed in the optical path between the rotating diffuser plate 70 and the polarization conversion element 93, as shown in FIG. 6. The $\lambda/2$ plate 61 is so set that the direction of the optic axis thereof is inclined by an angle greater than or equal to $-45°$ but smaller than or equal to $+45°$ ($22.5°$, for example) to the polarization direction of linearly polarized light emitted from the first solid-state light sources 52 and incident on the $\lambda/2$ plate 61 without undergoing the depolarization in the rotating diffuser plate 70. The other points are the same as those in the configuration described above. The same elements as those in FIG. 2 therefore have the same reference characters, and no description thereof will be made in detail. In FIG. 6, the second light source array 10, the dichroic mirror 22, and other members are omitted for convenience.

The $\lambda/2$ plate 60 in the first embodiment is disposed in the optical path between the first light source array 50 and the rotating diffuser plate 70. In this configuration, in which the linearly polarized light emitted from the first light source array 50 is converted by the $\lambda/2$ plate 60 into circularly or elliptically polarized light and then diffused by the rotating diffuser plate 70, the light incident on the polarization conversion element 93 is randomly polarized.

In contrast, the $\lambda/2$ plate 61 in the present embodiment is disposed in the optical path between the rotating diffuser plate 70 and the polarization conversion element 93, as shown in FIG. 6. In this configuration, the linearly polarized light emitted from the first light source array 50 is diffused and hence depolarized by the rotating diffuser plate 70 to form diffused light containing a polarized light component polarized in a direction perpendicular to the direction in which the linearly polarized light is polarized. It is, however, noted that the linearly polarized light emitted from the first light source array 50 is not completely depolarized by the rotating diffuser plate 70, but that the polarization state of the diffused light strongly reflects the polarization state of the linearly polarized light emitted from the first light source array 50. For example, the diffused light having exited from the rotating diffuser plate 70 contains a polarized light component incident as S-polarized light in the proportion of 70% and a polarized light component incident as P-polarized light in the proportion of 30%. The diffused light is then converted by the $\lambda/2$ plate 61 into circularly or elliptically polarized light. For example, the S-polarized light in the diffused light is converted by the $\lambda/2$ plate 61 into right-hand circularly or elliptically polarized light. On the other hand, the P-polarized light in the diffused light is converted by the $\lambda/2$ plate 61 into left-hand circularly or elliptically polarized light. As a result, the light incident on the polarization conversion element 93 contains the P-polarized light and the S-polarized light with the proportions thereof roughly equal to each other.

The $\lambda/2$ plate 61 in the present embodiment is specifically disposed in the optical path between the first pickup optical system 80 and the fly's eye integrator 90. The first pickup optical system 80 functions as an optical unit that parallelizes the diffused light having exited from the rotating diffuser plate 70 and delivers the parallelized diffused light to the $\lambda/2$ plate 61. When the $\lambda/2$ plate 61 is disposed in the optical path between the first pickup optical system 80 and the fly's eye integrator 90, the diffused light having exited from the rotating diffuser plate 70 is incident on the $\lambda/2$ plate 61 roughly at right angles, whereby the diffused light can be reliably converted into light having a desired polarization state. Further, since the light diffused by the rotating diffuser plate 70 is not concentrated but is collimated and incident on the $\lambda/2$ plate 61, the $\lambda/2$ plate 61 will not be thermally degraded due to heat generated by the light having exited from the rotating diffuser plate 70. It is noted that the $\lambda/2$ plate 61 is not necessarily disposed in the optical path between the first pickup optical system 80 and the fly's eye integrator 90 but may be disposed in any position in the optical path between the first pickup optical system 80 and the polarization conversion element 93. It is, however, also noted that the $\lambda/2$ plate 61 is preferably disposed in the optical path between the first pickup optical system 80 and the fly's eye integrator 90 because the advantageous effect described above is provided.

According to the projector 1001 of the present embodiment, the linearly polarized light emitted from the first light source array 5Q is diffused by the rotating diffuser plate 70, and the diffused light is converted by the $\lambda/2$ plate 61 into circularly or elliptically polarized light and incident on the polarization conversion element 93. As a result, the light incident on the polarization conversion element 93 contains P-polarized light and S-polarized light with the proportions thereof roughly equal to each other. The light fluxes that exit, respectively, through the light exiting areas S2A and S2B of the polarization conversion element 93 therefore have roughly the same intensity. The projector 1001 can therefore suppress occurrence of illuminance unevenness and excel in the quality of a displayed image.

When the linearly polarized light (linearly polarized light not having undergone depolarization but having passed through rotating diffuser plate 70 and linearly polarized light component having undergone depolarization and having been polarized in direction perpendicular to direction in which original linearly polarized light is polarized) is obliquely incident on the λ/2 plate 61, which is a birefringence element and the performance thereof typically depends on the angle of incidence of the light incident thereon, the linearly polarized light may not be converted into light having a desired polarization state in some cases.

In contrast, in the projector 1001 according to the present embodiment of the invention, since the first pickup optical system 80 is provided in the optical path between the rotating diffuser plate 70 and the λ/2 plate 61, the linearly polarized light is incident on the λ/2 plate 61 roughly at right angles. The linearly polarized light can therefore be converted into light having a desired polarization state, whereby occurrence of illuminance unevenness can be reliably suppressed.

Third Embodiment

Figure 7:
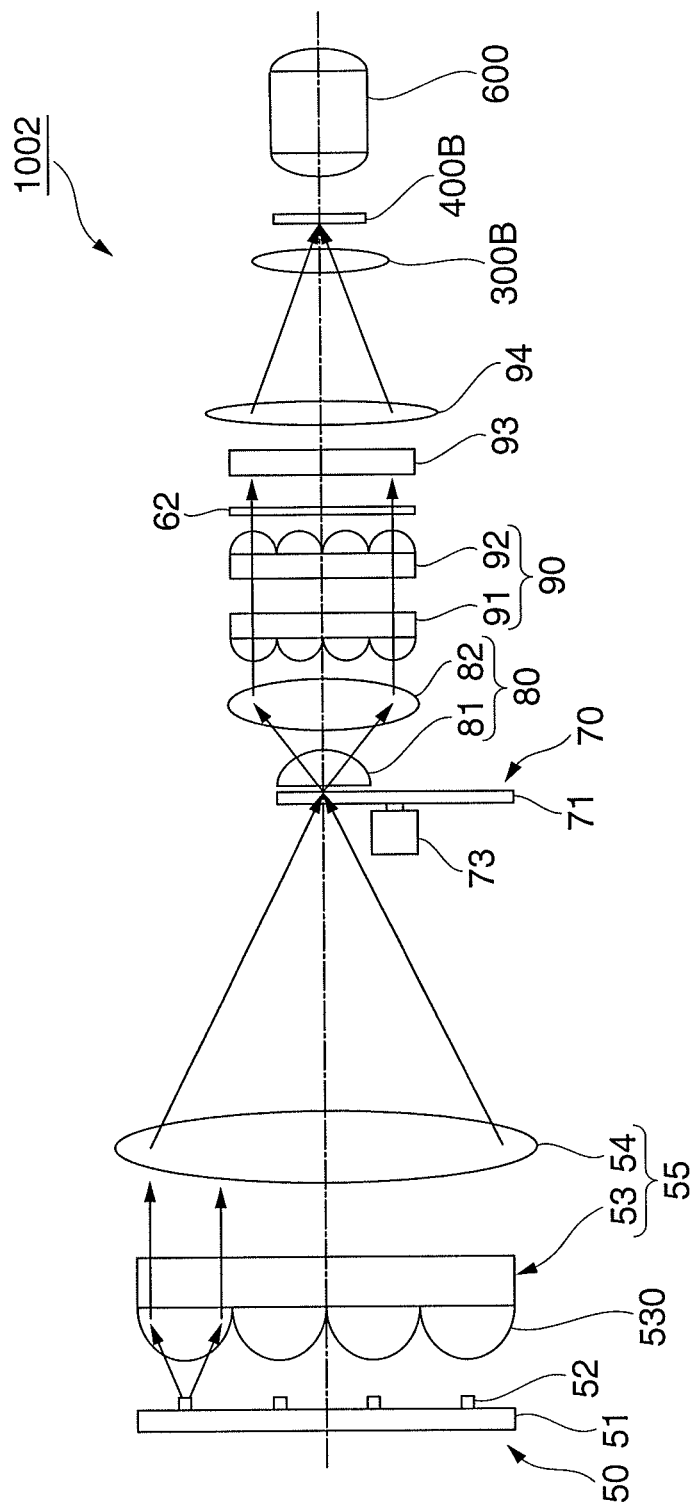
FIG. 7 is a schematic view showing the optical system of a projector according to a third embodiment of the invention.

FIG. 7 is a schematic view corresponding to FIG. 6 and showing the optical system of a projector 1002 according to a third embodiment of the invention.

The projector 1002 according to the present embodiment differs from the projector 1001 according to the second embodiment described above in that a λ/2 plate 62 as the birefringence element is disposed in the optical path between the fly's eye integrator 90 and the polarization conversion element 93, as shown in FIG. 7. The λ/2 plate 62 is so set that the direction of the optic axis thereof is inclined by an angle greater than or equal to −45° but smaller than or equal to +45° (−22.5°, for example) to the polarization direction of linearly polarized light emitted from the first solid-state light sources 52 and incident on the λ/2 plate 62 without undergoing depolarization in the rotating diffuser plate 70. The other points are the same as those in the configuration described above. The same elements as those in FIG. 6 therefore have the same reference characters, and no description thereof will be made in detail. In FIG. 7, the second light source array 10, the dichroic mirror 22, and other members are omitted for convenience.

In the projector 1002 according to the present embodiment as well, parallelized linearly polarized light is incident on the λ/2 plate 62 as the birefringence element. The linearly polarized light can therefore be converted into circularly or elliptically polarized light, whereby occurrence of illuminance unevenness can be reliably suppressed.

Fourth Embodiment

Figure 8:
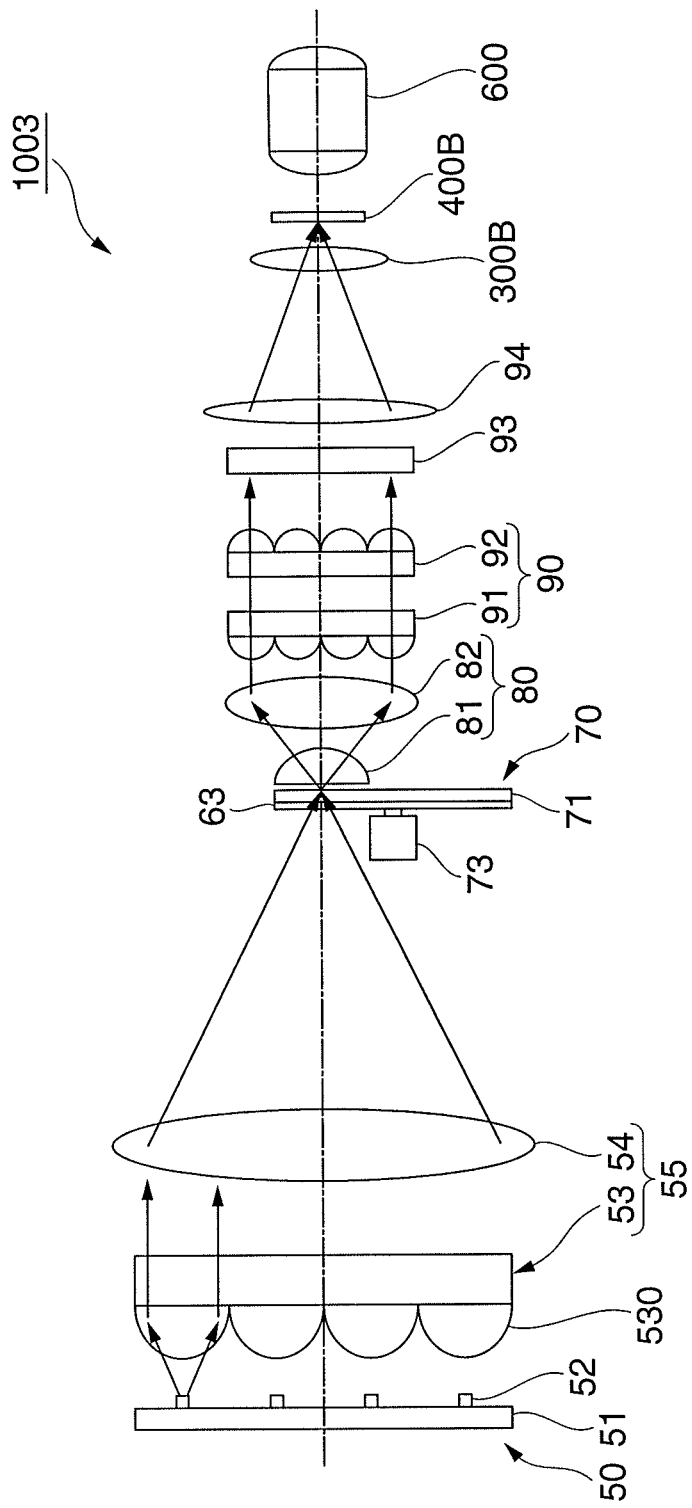
FIG. 8 is a schematic view showing the optical system of a projector according to a fourth embodiment of the invention.

FIG. 8 is a schematic view corresponding to FIG. 2 and showing the optical system of a projector 1003 according to a fourth embodiment of the invention.

The projector 1003 according to the present embodiment differs from the projector 1000 according to the first embodiment described above in that a λ/2 plate 63 as the birefringence element is disposed at the light incident surface of the rotating diffuser plate 70, as shown in FIG. 8. The other points are the same as those in the configuration described above. The same elements as those in FIG. 2 therefore have the same reference characters, and no description thereof will be made in detail. In FIG. 8, the second light source array 10, the dichroic mirror 22, and other members are omitted for convenience.

The angle between the polarization direction of the linearly polarized light emitted from the first solid-state light sources 52 and incident on the λ/2 plate 63 and the direction of the optic axis of the λ/2 plate 63 changes between −90° and 90° as the rotating diffuser plate 70 rotates. The light incident on the polarization conversion element 93 are therefore integrated with time and hence contains P-polarized light and S-polarized light with the proportions thereof roughly equal to each other. The light fluxes that exit, respectively, through the light exiting areas S2A and S2B of the polarization conversion element 93 therefore have roughly the same intensity. The projector 1003 can therefore suppress occurrence of illuminance unevenness and excel in the quality of a displayed image.

The λ/2 plate 63 is not necessarily disposed at the light incident surface of the rotating diffuser plate 70 but may alternatively be disposed at the light exiting surface of the rotating diffuser plate 70. In FIG. 8, the λ/2 plate 63 is formed all over the substrate 71, but the λ/2 plate 63 is not necessarily formed all over the substrate 71. The λ/2 plate 63 only needs to be formed at least in the position where the light from the first light source array 50 is incident (position where light is focused by first condenser lens 54).

According to the projector 1003 of the present embodiment, since the rotation of the rotating diffuser plate 70 causes heat generated by the light with which the λ/2 plate 63 is irradiated to be dissipated in the circumferential direction of the rotating diffuser plate 70, no heat is accumulated in the λ/2 plate 63, whereby the λ/2 plate 63 will not be thermally degraded but can last long.

Fifth Embodiment

Figure 9:
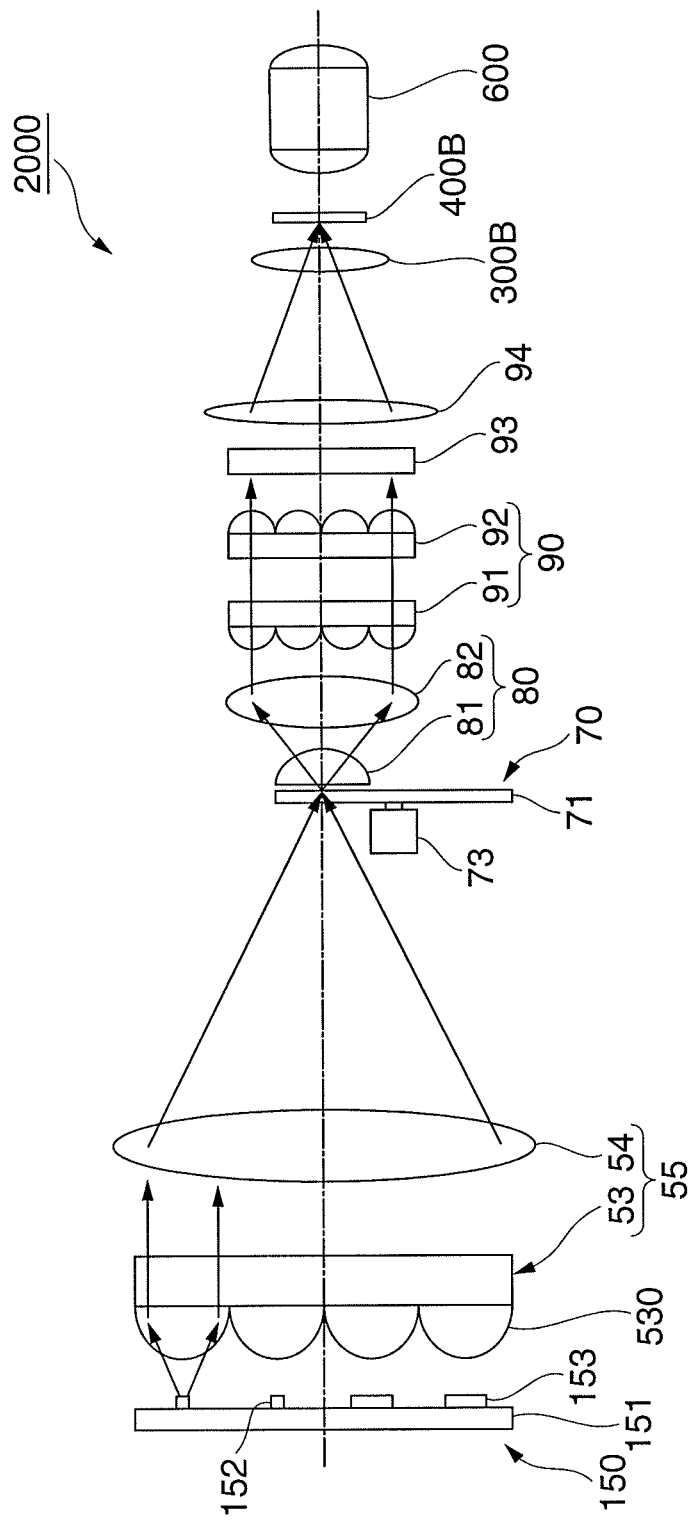
FIG. 9 is a schematic view showing the optical system of a projector according to a fifth embodiment of the invention.

FIG. 9 is a schematic view corresponding to FIG. 2 and showing the optical system of a projector 2000 according to a fifth embodiment of the invention.

The projector 2000 according to the present embodiment differs from the projector 1000 according to the first embodiment described above in that no λ/2 plate as the birefringence element is provided and two types of solid-state light sources 152 and 153 are disposed in a first light source array 150, as shown in FIG. 9. The other points are the same as those in the configuration described above. The same elements as those in FIG. 2 therefore have the same reference characters, and no description thereof will be made in detail. In FIG. 9, the second light source array 10, the dichroic mirror 22, and other members are omitted for convenience.

Figure 10:
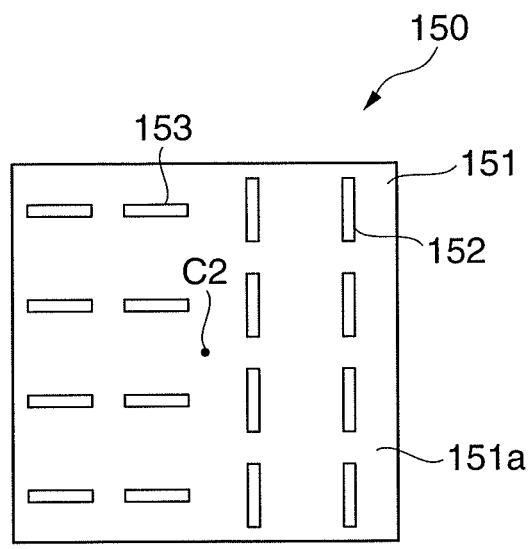
FIG. 10 shows two types of solid-state light sources mounted on a first base according to the fifth embodiment of the invention.

FIG. 10 is a plan view showing the two types of solid-state light sources 152 and 153 mounted on a first base 151. The first light source array 150 includes the first solid-state light sources 152 that emit first linearly polarized light and the second solid-state light sources 153 that emit second linearly polarized light. In the arrangement of the first solid-state light sources 152 and the second solid-state light sources 153, they are so rotated relative to each other in a plane 151*a* of the first base 151 that the longitudinal directions of the two light sources are perpendicular to each other. The first linearly polarized light emitted from the first solid-state light sources 152 and the second linearly polarized light emitted from the second solid-state light sources 153 pass through the rotating diffuser plate 70 without undergoing depolarization in the rotating diffuser plate 70. The longitudinal direction of the first solid-state light sources 152 and the longitudinal direction of the second solid-state light sources 153 are so set that the light emitted from the first solid-state light sources 152 and diffused by the rotating diffuser plate 70 is primarily formed of light polarized in the direction inclined by 0° to the plane of incidence of the polarization separation films 931 (P-polarized light) and the light emitted from the second solid-state light sources 153 and diffused by the rotating diffuser plate 70 is primarily formed of light polarized in the direction inclined by 90° to the plane of incidence of the polarization separation films 931 (S-polarized light).

Eight first solid-state light sources 152 are arranged in a matrix having four rows and two columns on the surface 151a of the first base 151, and eight second solid-state light sources 153 are also arranged in a matrix having four rows and two columns on the surface 151a of the first base 151, as shown in FIG. 10. The number of thus arranged first solid-state light sources 152 and the number of thus arranged second solid-state light sources 153 are equal to each other. The two types of solid-state light sources, the first solid-state light sources 152 and the second solid-state light sources 153, are arranged in a matrix having four rows and four columns. In the first light source array 150 in the present embodiment, in which sixteen solid-state light sources are arranged, the number of arranged solid-state light sources is not limited to sixteen. The center C2 of the first base 151 coincides with the optical axis of the first pickup optical system 80 shown in FIG. 9.

The eight first solid-state light sources 152 are so arranged in an orderly manner that the longitudinal direction thereof is parallel to a side of the first base 151 (right and left sides in FIG. 10), which has a rectangular shape in a plan view. Each of the plurality of light fluxes emitted from the plurality of first solid-state light sources 152 therefore has the same polarization direction.

On the other hand, the eight second solid-state light sources 153 are so arranged in an orderly manner that the longitudinal direction thereof is perpendicular to the side of the first base 151 (right and left sides in FIG. 10), which has a rectangular shape in a plan view. Each of the plurality of light fluxes emitted from the plurality of second solid-state light sources 153 therefore has the same polarization direction.

If the first light source array 150 includes one type of solid-state light sources that deliver P-polarized light or S-polarized light to the polarization separation films 931, the diffused light having exited from the rotating diffuser plate 70 is biased toward the P-polarized light or the S-polarized light. As a result, light of a relatively high intensity exits through an area of the polarization conversion element, and light of a relatively low intensity exits through the remaining area of the polarization conversion element, resulting in a problem of occurrence of illuminance unevenness.

In contrast, in the projector 2000 according to the present embodiment of the invention, which includes the two types of solid-state light sources, the first solid-state light sources 152, which deliver P-polarized light to the polarization separation films 931, and the second solid-state light sources 153, which deliver S-polarized light to the polarization separation films 931, the diffused light having exited from the rotating diffuser plate 70 is not biased toward the P-polarized light or the S-polarized light. In other words, the situation in which light of a relatively high intensity exits through an area of the polarization conversion element 93 and light of a relatively low intensity exits through the remaining area of the polarization conversion element 93 will not occur. The projector 2000 can therefore suppress occurrence of illuminance unevenness and excel in the quality of a displayed image.

Further, according to the configuration described above, since the number of arranged first solid-state light sources 152 and the number of arranged second solid-state light sources 153 are equal to each other, the diffused light having exited from the rotating diffuser plate 70 contains P-polarized light and S-polarized light with the proportions thereof equal to each other. As a result, the light fluxes that exit, respectively, through the light exiting areas of the polarization conversion element 93 have the same intensity, which reliably prevents illuminance unevenness from occurring.

The projector 2000 according to the present embodiment has been described with reference to the case where the number of arranged first solid-state light sources 152 and the number of arranged second solid-state light sources 153 are equal to each other, but the projector 2000 is not necessarily configured this way. For example, the number of arranged first solid-state light sources 152 and the number of arranged second solid-state light sources 153 may be roughly equal to each other. The phrase "roughly equal to each other" used herein means that the difference between the number of arranged first solid-state light sources and the number of arranged second solid-state light sources falls within ±5%.

Further, the projector 2000 according to the present embodiment has been described with reference to the case where eight first solid-state light sources 152 are arranged in a matrix having four rows and two columns on the surface 151a of the first base 151 and eight second solid-state light sources 153 are arranged in a matrix having four rows and two columns on the surface 151a of the first base 151, but the projector 2000 is not necessarily configured this way. The first solid-state light sources 152 and the second solid-state light sources 153 can be arranged differently from each other in a variety of arrangement configurations.

First Variation

Figure 11:
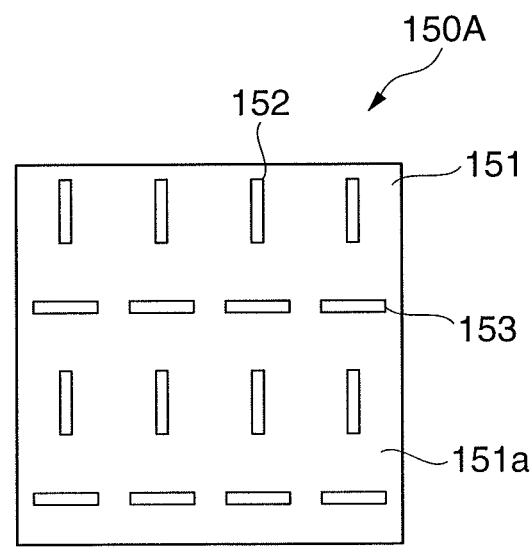
FIG. 11 shows a first variation in which two types of solid-state light sources are arranged on the first base according to the fifth embodiment of the invention.

FIG. 11 is a plan view showing a first variation in which the two types of solid-state light sources 152 and 153 are arranged differently on the first base 151.

In a first light source array 150A in the present variation, eight first solid-state light sources 152 are arranged in a matrix having two rows and four columns on the surface 151a of the first base 151 and eight second solid-state light sources 153 are arranged in a matrix having two rows and four columns on the surface 151a of the first base 151, as shown in FIG. 11. In the present variation, four first solid-state light sources 152 and four second solid-state light sources 153 are alternately arranged. The number of arranged first solid-state light sources 152 and the number of arranged second solid-state light sources 153 are equal to each other. The two types of solid-state light sources, the first solid-state light sources 152 and the second solid-state light sources 153, are arranged in a matrix having four rows and four columns. In the first light source array 150A in the present variation, sixteen solid-state light sources are arranged, but the number of thus arranged solid-state light sources is not limited to sixteen.

In the present variation as well, since the number of arranged first solid-state light sources 152 and the number of arranged second solid-state light sources 153 are roughly equal to each other, the diffused light having exited from the rotating diffuser plate 70 contains P-polarized light and S-polarized light with the proportions thereof roughly equal to each other. As a result, the light fluxes that exit, respectively, through the light exiting areas of the polarization conversion element 93 have the same intensity, which reliably prevents illuminance unevenness from occurring.

Second Variation

Figure 12:
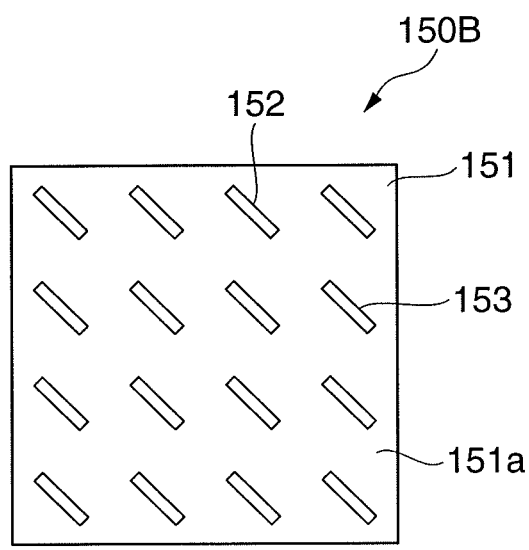
FIG. 12 shows a second variation in which two types of solid-state light sources are arranged on the first base according to the fifth embodiment of the invention.

FIG. 12 is a plan view showing a second variation in which the two types of solid-state light sources 152 and 153 are arranged differently on the first base 151.

A first light source array 150B in the present variation differs from the first variation shown in FIG. 11 in terms of the longitudinal direction of the first solid-state light sources 152 and the longitudinal direction of the second solid-state light sources 153. In the present variation, the longitudinal direction of the first solid-state light sources 152 and the longitudinal direction of the second solid-state light sources 153 coincide with each other. The longitudinal direction of the first solid-state light sources 152 and the longitudinal direction of the second solid-state light sources 153 are, however, so set that the light emitted from the first solid-state light sources 152 and diffused by the rotating diffuser plate 70 is primarily formed of light polarized in the direction inclined by 45° to the plane of incidence of the polarization separation films 931 and the light emitted from the second solid-state light sources 153 and diffused by the rotating diffuser plate 70 is primarily formed of light polarized in the direction inclined by 45° to the plane of incidence of the polarization separation films 931.

In the present variation as well, the diffused light having exited from the rotating diffuser plate 70 contains P-polarized light and S-polarized light with the proportions thereof roughly equal to each other. As a result, the light fluxes that exit, respectively, through the light exiting areas of the polarization conversion element 93 have roughly the same intensity, which reliably prevents illuminance unevenness from occurring.

The invention is applicable not only to a front-projection projector in which an image is projected from the viewer's side, where a viewer observes the screen, but also to a rear-projection projector in which an image is projected from the side that is opposite the viewer's side.

The above embodiments have been described with reference to the case where the light source apparatus according to any of the embodiments of the invention is used in a projector, but the light source apparatus is not necessarily used in a projector. For example, the light source apparatus according to any of the embodiments of the invention is also applicable to other optical instruments (optical disk apparatus, automobile headlamp, and illumination instrument, for example).

The entire disclosure of Japanese Patent Application No. 2012-047090, filed on Mar. 2, 2012 is expressly incorporated by reference herein.

What is claimed is:

1. A projector comprising:
   a solid-state light source that emits linearly polarized light;
   a birefringence element that converts the linearly polarized light emitted from the solid-state light source into circularly or elliptically polarized light;
   a diffusion element that diffuses the light having exited from the birefringence element; and
   a polarization conversion element that separates the diffused light having exited from the diffusion element into first polarized light polarized in a first polarization direction and second polarized light polarized in a second polarization direction, converts the polarization direction of the first polarized light into the second polarization direction, and outputs the resultant second polarized light.

2. The projector according to claim 1,
   further comprising an optical unit disposed in an optical path between the solid-state light source and the birefringence element,
   wherein the optical unit parallelizes the linearly polarized light emitted from the solid-state light source and delivers the parallelized linearly polarized light to the birefringence element.

3. The projector according to claim 1,
   wherein the birefringence element is a λ/2 plate whose optic axis is inclined to the polarization direction of the linearly polarized light incident on the birefringence element by an angle greater than or equal to −45° but smaller than or equal to +45°.

4. The projector according to claim 1,
   wherein the birefringence element is a λ/4 plate whose optic axis is inclined to the polarization direction of the linearly polarized light incident on the birefringence element by an angle greater than or equal to −45° but smaller than or equal to +45°.

5. The projector according to claim 1,
   further comprising a rotating diffuser, rotatable by a motor, that shifts the position where the light is incident on the birefringence element.

6. A projector comprising:
   a solid-state light source that emits linearly polarized light;
   a diffusion element that diffuses the linearly polarized light emitted from the solid-state light source;
   a birefringence element that converts the diffused light having exited from the diffusion element into circularly or elliptically polarized light; and
   a polarization conversion element that separates the light having exited from the birefringence element into first polarized light polarized in a first polarization direction and second polarized light polarized in a second polarization direction, converts the polarization direction of the first polarized light into the second polarization direction, and outputs the resultant second polarized light.

7. The projector according to claim 6,
   further comprising an optical unit disposed in an optical path between the diffusion element and the birefringence element,
   wherein the optical unit parallelizes the diffused light having exited from the diffusion element and delivers the parallelized linearly polarized light to the birefringence element.

8. A projector comprising:
   a first solid-state light source that emits first linearly polarized light;
   a second solid-state light source that emits second linearly polarized light;
   a diffusion element that diffuses the first linearly polarized light emitted from the first solid-state light source and the second linearly polarized light emitted from the second solid-state light source; and
   a polarization conversion element that separates the diffused light having exited from the diffusion element into first polarized light polarized in a first polarization direction and second polarized light polarized in a second polarization direction, converts the polarization direction of the first polarized light into the second polarization direction, and outputs the resultant second polarized light.

9. The projector according to claim 8,
   wherein the polarization conversion element includes a polarization separation film,
   a component of the diffused light that has been emitted from the first solid-state light source is primarily formed of light polarized in a direction inclined by 0° to a plane of incidence of the polarization separation film, and
   a component of the diffused light that has been emitted from the second solid-state light source is primarily formed of light polarized in a direction inclined by 90° to the plane of incidence of the polarization separation film.

10. The projector according to claim 8,
    wherein the polarization conversion element includes a polarization separation film,
    a component of the diffused light that has been emitted from the first solid-state light source is primarily formed of light polarized in a direction inclined by 45° to a plane of incidence of the polarization separation film, and
    a component of the diffused light that has been emitted from the second solid-state light source is primarily formed of light polarized in the direction inclined by 45° to the plane of incidence of the polarization separation film.

11. The projector according to claim 8,
wherein the number of the first solid-state light sources and the number of the second solid-state light sources are roughly equal to each other.

12. A projector comprising:
an illuminator that emits light;
a light modulator that modulates the light emitted from the illuminator,
a projection system that projects the light emitted from the light modulator,
wherein the illuminator comprises:
   a solid-state light source that emits linearly polarized light;
   a birefringence element that converts the linearly polarized light emitted from the solid-state light source into circularly or elliptically polarized light;
   a diffusion element that diffuses the light having exited from the birefringence element; and
   a polarization conversion element that separates the diffused light having exited from the diffusion element into first polarized light polarized in a first polarization direction and second polarized light polarized in a second polarization direction, converts the polarization direction of the first polarized light into the second polarization direction, and outputs the resultant second polarized light.

* * * * *